(12) United States Patent
Carty et al.

(10) Patent No.: US 10,251,129 B2
(45) Date of Patent: Apr. 2, 2019

(54) MULTIPLE DENSITY CONFIGURATIONS AND ALGORITHMS FOR INTELLIGENT POWER SAVINGS INFRASTRUCTURE IN WIRELESS LANS

(71) Applicant: Cisco Technology, Inc., San Jose, CA (US)

(72) Inventors: Clark Carty, Brunswick, OH (US); Corey Metsker, Clinton, OH (US); Chad Jones, Doylestown, OH (US); Robert Bowser, Copley, OH (US)

(73) Assignee: Cisco Technology, Inc., San Jose, CA (US)

( * ) Notice: Subject to any disclaimer, the term of this patent is extended or adjusted under 35 U.S.C. 154(b) by 514 days.

(21) Appl. No.: 13/968,512

(22) Filed: Aug. 16, 2013

(65) Prior Publication Data
US 2013/0329619 A1     Dec. 12, 2013

Related U.S. Application Data

(62) Division of application No. 13/191,102, filed on Jul. 26, 2011, now Pat. No. 8,537,735, which is a division
(Continued)

(51) Int. Cl.
*H04W 52/02*     (2009.01)
*G06F 1/3203*     (2019.01)
(Continued)

(52) U.S. Cl.
CPC ...... *H04W 52/0235* (2013.01); *G06F 1/3203* (2013.01); *G06F 1/3209* (2013.01);
(Continued)

(58) Field of Classification Search
CPC ............. H04L 45/28; H04L 2012/5627; H04L 41/0668; H04L 1/22; H04L 2012/5608;
(Continued)

(56) References Cited

U.S. PATENT DOCUMENTS

| | | | |
|---|---|---|---|
| 7,274,929 B1 * | 9/2007 | Banginwar | H04W 52/0258 455/418 |
| 7,420,925 B2 * | 9/2008 | Hori | H04W 24/04 370/242 |

(Continued)

*Primary Examiner* — Brenda H Pham
(74) *Attorney, Agent, or Firm* — Patterson + Sheridan, LLP

(57) ABSTRACT

Described in example embodiments herein are techniques for implementing power savings in a wireless local area network (WLAN). In accordance with an example embodiment, a centralized controller can be employed to gather data about network activity and select access points to switch to power save mode. Optionally, the controller may designate certain access points to remain active so as to monitor for clients attempting to access the WLAN. An aspect of an example embodiment is that it allows the controller to configure and manage power consumption based on demands on the overall system. In an example embodiment, techniques for implementing power savings within individual hardware components, such as access points, are disclosed. An aspect of a technique described in an example embodiment is that it provides flexibility to balance power savings and performance.

20 Claims, 32 Drawing Sheets

Related U.S. Application Data of application No. 12/167,632, filed on Jul. 3, 2008, now Pat. No. 8,023,444.

(51) Int. Cl.
*G06F 1/3209* (2019.01)
*G06F 1/3234* (2019.01)

(52) U.S. Cl.
CPC .......... *G06F 1/3253* (2013.01); *Y02D 10/151* (2018.01); *Y02D 70/142* (2018.01); *Y02D 70/22* (2018.01)

(58) Field of Classification Search
CPC ..... H04W 84/12; H04W 88/08; H04W 80/04; H04W 88/06
USPC .............. 370/219, 220, 310.2, 328, 338, 311
See application file for complete search history.

(56) References Cited

U.S. PATENT DOCUMENTS

| | | | | |
|---|---|---|---|---|
| 2006/0063560 | A1* | 3/2006 | Herle | H04W 36/32 455/552.1 |
| 2006/0253735 | A1* | 11/2006 | Kwak | G06F 1/3203 714/12 |
| 2006/0262739 | A1* | 11/2006 | Ramirez | H04W 88/06 370/311 |
| 2007/0076683 | A1* | 4/2007 | Chung | H04W 52/0216 370/350 |
| 2009/0010190 | A1* | 1/2009 | Gong | H04L 45/26 370/311 |

\* cited by examiner

MULTIPLE DENSITY CONFIGURATIONS AND ALGORITHMS FOR INTELLIGENT POWER SAVINGS INFRASTRUCTURE IN WIRELESS LANS

CROSS REFERENCE TO RELATED APPLICATIONS

This application is a divisional application of U.S. patent application Ser. No. 13/191,102, filed on Jul. 26, 2011, which is divisional application of U.S. patent application Ser. No. 12/167,632 filed Jul. 3, 2008.

TECHNICAL FIELD

The present disclosure relates generally to wireless networks.

BACKGROUND

Wireless networks may operate twenty-four hours a day, seven days a week. Most wireless network environments, however, do not need the entire network to be powered up at all times. For example, a typical workplace may have very low use requirements during evening and weekend hours. During low use periods, it is desirable to power down unneeded devices in order to save energy and, consequently, costs. Traditionally, the components of a network, such as an access point (AP) and controller, contain facilities to disable subsections so as to limit power consumption. A challenge to the system designer is to determine when to enter and exit power saving modes.

BRIEF DESCRIPTION OF THE DRAWINGS

The accompanying drawings, incorporated herein and forming a part of the specification, illustrate the example embodiments.

OVERVIEW OF EXAMPLE EMBODIMENTS

Figure 1:
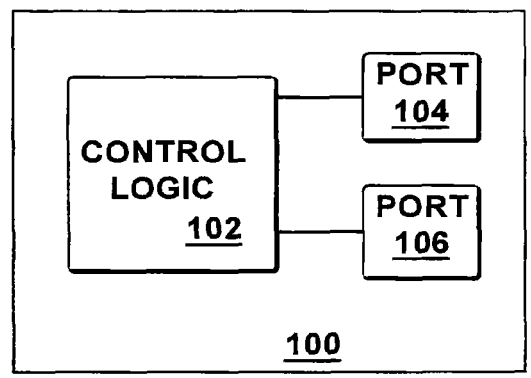
FIG. 1 illustrates an example of a controller upon which an example embodiment is implemented.

The following presents a simplified overview of the example embodiments in order to provide a basic understanding of some aspects of the example embodiments. This overview is not an extensive overview of the example embodiments. It is intended to neither identify key or critical elements of the example embodiments nor to delineate the scope of the appended claims. Its sole purpose is to present some concepts of the example embodiments in a simplified form as a prelude to the more detailed description that is presented later.

Described in example embodiments herein are techniques for implementing power savings in a wireless local area network (WLAN). In accordance with an example embodiment, a centralized controller can be employed to gather data about network activity and to select access points to switch to power save mode. Optionally, the controller may designate certain access points to remain active to monitor for clients attempting to access the WLAN. An aspect of an example embodiment is that it allows the controller to configure and manage power consumption based on demands on the overall system. In an example embodiment, techniques for implementing power savings within individual hardware components, such as access points, are disclosed. An aspect of a technique described in an example embodiment is that it provides flexibility to balance power savings and performance.

In accordance with an example embodiment, there is disclosed herein an apparatus comprising a plurality of ports configured to be coupled to a plurality of access points, and control logic configured to communicate with the plurality of access points via the plurality of ports and to control operation of the plurality of access points. The control logic is configured to receive data from the plurality of access points representative of network activity. The control logic is configured to select at least one of the plurality of access points to switch to a power save mode based on the data representative of network activity.

In accordance with an example embodiment, disclosed herein is an apparatus comprising processing logic and at least one wireless transceiver in communication with the processing logic. The processing logic is configured to communicate with an associated wireless controller. At least one of the processing logic and the at least one wireless transceiver is configured to switch to a power save mode responsive to a signal received from the associated controller to switch to a power save mode.

In accordance with an example embodiment disclosed herein is a method suitable for implementing power savings. The method comprises receiving data from a plurality of associated access points representative of network activity. The method further comprises determining which of the plurality of access points have associated clients and determining a set of access points selected from the plurality of access points to switch to a power save mode based on the data. A signal is sent to the set of access points to switch to a power save mode. The set of access points does not include access points having associated clients.

In accordance with an example embodiment, there is disclosed herein a method comprising receiving a signal from an associated controller to enter into a power save mode. One of a group consisting of a digital section and a radio section is selected to place into a low power state responsive to the signal. The selected one of a group consisting of a digital section and a radio section is then transitioned into the low power state.

DESCRIPTION OF EXAMPLE EMBODIMENTS

This description provides examples not intended to limit the scope of the appended claims. The figures generally indicate the features of the examples, where it is to be understood and appreciated that like reference numerals are used to refer to like elements. Reference in the specification to "one embodiment" or "an embodiment" or "an example embodiment" means that a particular feature, structure, or characteristic described in connection with the embodiment is included in at least one embodiment described herein. The appearances of the phrase "in one embodiment" or "in one or more embodiments" in various places in the specification are not necessarily all referring to the same embodiment, nor are separate or alternative embodiments mutually exclusive of other embodiments. Features and aspects of various embodiments may be integrated into other embodiments, and embodiments illustrated in this document may be implemented without all of the features or aspects illustrated or described.

Described herein are protocols and algorithms that enable power savings for wireless local area networks (WLANs). In an example embodiment, a centralized controller is used to configure and manage WLAN access points (APs) and controls power consumption based on demands on the WLAN. Using collective knowledge about network activity on different portions of the WLAN, predictive models may be applied to control power consumption.

In an example embodiment, after a period of inactivity an AP and, optionally, a lightly loaded controller will enter a power save mode, whereby the digital and radio sections will consume less power. While in the power savings mode (PSM), any number of individual or collective events will cause either a temporary wakeup or a longer wake period. Events such as WLAN activity or periodic wakeup and listen or detection of a mobile device (which may also be referred to as a mode node "MN") may trigger PSM logic. Events at the AP may trigger PSM logic on the controller.

In an example embodiment, the location and activity of mobile nodes (MNs) on the WLAN are used to determine portions of the network that can be transitioned to a PSM. For example, if there are neither MNs active on an AP nor on adjacent APs, then an AP can be triggered to enter a power save mode. In a multiple AP network, an AP may be triggered to exit power save mode and transition to a fully operational mode based on a number of events. For example, movement of an MN to an adjacent AP within a predefined distance to an AP can trigger transitioning an AP from a power save mode to an operational mode. Received signal strength indication (RSSI), time of arrival (TOA), or location-based information can be employed to determine when to transition an AP from a power save mode to an operational mode.

In an example embodiment, AP density of the WLAN may be managed in order to save power. In an example embodiment, density is based on load on the WLAN. For example, while a WLAN is lightly loaded, APs can be powered down, resulting in fewer APs covering the same area, which may also result in fewer controller subsystems that need to remain active. When a predetermined threshold for capacity is exceeded, then additional APs can be brought online.

On an AP, sections of the AP may be disabled so as to reduce power. These may include host CPU and associated systems (e.g., memory, peripherals, Ethernet MAC), radios, and/or portions of the power supply. Triggers that may bring an AP out of PSM include timer events (e.g., a predetermined time period that may be configurable depending on load, time of day, etc.), Ethernet activity (unicast, multicast, or broadcast), a wakeup signal from a specified MAC address, WLAN activity within or in adjacent cells, a controller command, etc. An AP in a Power over Ethernet (PoE) system can remain linked to the upstream powering device while in power save mode.

In an example embodiment, power save modes are controlled through algorithms that use collective information of the WLAN. The operation of these algorithms may be configured by a system administrator to achieve a desired power save level. Different levels of power savings, such as aggressive, medium, or limited, may be applied to a single device on the WLAN or to multiple devices on the WLAN. In particular embodiments, power save modes may be applied based on schedules such that different settings are applied at different times or dates. For example, more aggressive power savings can be activated during evening hours when networks are ordinarily more lightly loaded.

In an example embodiment, load balancing logic is employed in conjunction with power save logic. For example, mobile devices may be distributed to APs in a power aware mode that combines mobile devices to an AP so as to reduce the number of APs that are currently active.

Besides employing algorithms described herein, other techniques described herein may be employed to reduce power consumption. These include reducing power to portions of an AP, such as powering the radio portion while deactivating the control logic, deactivating the radio portion while maintaining power to the digital portion, completely powering off an AP for a specified interval, etc. For multiple input multiple output (MIMO) radios, limiting operation to a single receive and transmit path may be employed so as to reduce power consumption. Additional hardware or logic may be added to an AP to facilitate power savings: for example, a low power microcontroller that can monitor the Ethernet port and activate the AP if activity is detected on the Ethernet port; or, as another example, a staged power supply architecture that is designed to operate using lower power consumption when a device is lightly loaded.

In an example embodiment, one or more of the following algorithms may be employed to determine when a device should enter or exit power save mode. The algorithms described herein are adjustable in terms of how aggressively a system should attempt to save power. As used in the description below, a node can refer to an AP. The algorithms described herein include:

One-hot monitor algorithm: a single node remains active for detecting network activity. Upon detecting activity, decisions can be made on which, if any, other nodes;

One-hot moving monitor: a single node remains active looking for network activity. Various nodes take turns being the monitor node. Upon detecting activity, decisions can be made on which, if any, other nodes;

N fixed nodes: a set of nodes periodically look for activity and then power down. Upon detecting activity, decisions can be made on which, if any, other nodes;

N varying nodes: on increasing activity, maintain a number of nodes to be active but select different nodes to be active based on the location of the demand;

Trivial increase algorithm: upon detecting increasing activity, increase number of active nodes incrementally in a predetermined order;

Active grouping increase: upon detecting increased activity, increase number of active nodes by activating a minimum number of nodes based on the location of activity;

Neighbor activity: upon an association of a mobile device to an AP, enables surrounding APs. Surrounding APs are enabled in anticipation of roaming;

Load threshold: upon exceeding a threshold for utilization on a single node, activate one or more surrounding nodes to share load; and/or Cell size adjustment: transmit power, clear channel assessment (CCA), and start of packet (SOP) can be varied. For example, transmit power can be increased while CCA and SOP can be decreased in order to increase cell size.

Referring to FIG. 1, there is illustrated a controller 100 upon which an example embodiment is implemented. Controller 100 comprises control logic 102 and ports 104, 106. Ports 104, 106 are used to communicate with associated access points (not shown). Although the example embodiment illustrated in FIG. 1 shows two ports 104, 106, those skilled in the art will readily appreciate that controller 100 may suitably comprise any physically realizable number of ports. Control logic 102 is configured to provide the functionality described herein. Logic, as used herein, includes but is not limited to hardware, firmware, software, and/or combinations of each to perform a function(s) or an action(s) and/or to cause a function or action from another component. For example, based on a desired application or need, logic may include a software-controlled microprocessor, discrete logic such as an application-specific integrated circuit (ASIC), a programmable/programmed logic device, a memory device containing instructions or the like, or combinational logic embodied in hardware. Logic also may be fully embodied as software.

Figure 2:
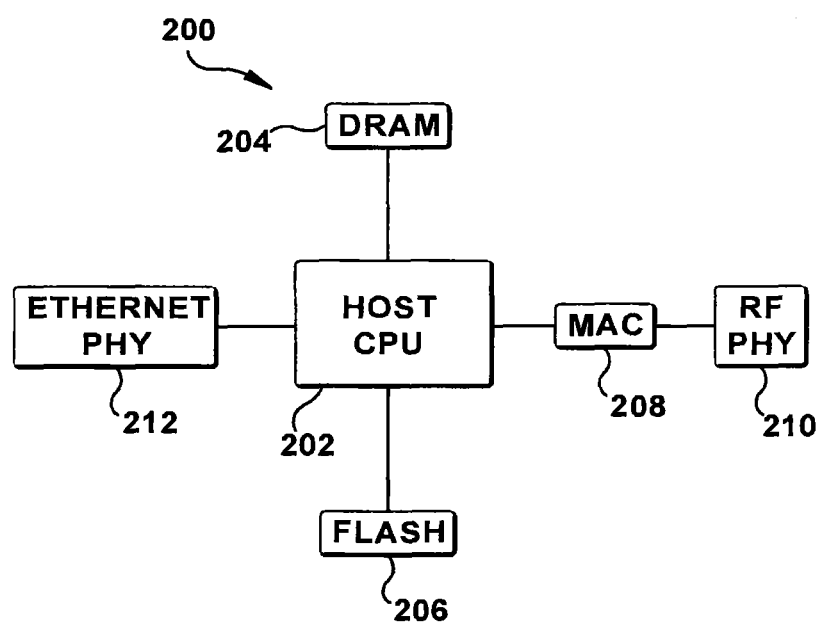
FIG. 2 illustrates an example of an access point upon which an example embodiment is implemented.

Referring to FIG. 2, there is illustrated an access point (AP) 200 upon which an example embodiment is implemented. Access point 200 comprises a host central processing unit (CPU) 202, dynamic random access memory (DRAM) 204 and Flash Memory 206. Host CPU 202 controls the operation of AP 200. Instructions for execution by CPU 202 may be stored in Flash Memory 206. Host CPU 202 may employ DRAM 204 for temporary storage. Media Access Control (MAC) circuit 208 may suitably comprise logic for performing MAC layer functions for AP 200. Physical Layer (PHY) circuit 210 may suitably comprise logic for performing physical layer functionality and appropriate Radio Frequency (RF) circuitry. Ethernet PHY 212 allows Host CPU 202 to communicate with an associated (e.g. Ethernet) network. Those skilled in the art should readily appreciate that different PHYs may be used in place of Ethernet PHY 212, depending on the type of associated network. For example, a PHY with RF circuitry may be employed instead of an Ethernet PHY if the distribution network (not shown) is a mesh network.

In an example embodiment, AP 200 may suitably comprise a plurality of radio modules. As will be shown in other examples herein, AP 200 may suitably comprise two radios, where each radio comprises MAC and RF/PHY circuits. In particular embodiments, the radios may operate using different protocols. For example, APs compliant with the Institute of Electrical and Electronics (IEEE) 802.11 standard may suitably comprise one radio configured to operate using the 802.11a protocol (operating in the 5 GHz band) and one radio configured to operate using the 802.11b protocol (operating in the 2.4 GHz band).

In operation, packets for transmission by RF/PHY 210 are received by Ethernet PHY 212. The packets are processed by CPU 202. The packets may be stored in DRAM 204 while transitioning between Ethernet PHY 212 and RF/PHY 210. The packet is processed by MAC 208 and transmitted by RF/PHY 210.

Packets received at RF/PHY 210 are forwarded to MAC 208 and then to host CPU 202. RF/PHY 210, MAC 208, or host CPU 202 may generate an acknowledgement (ACK) to the received packet. The packet may be stored in DRAM 204 for processing by host CPU 202. If the packet is destined for a node on the distribution network, the packet is forwarded onto the distribution network by Ethernet PHY 212.

Figure 3:
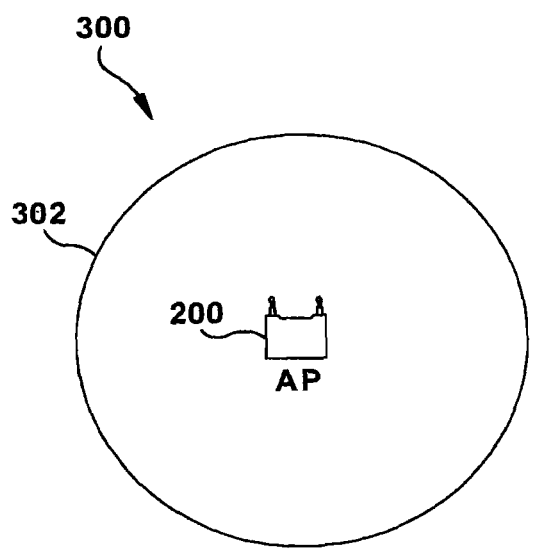
FIG. 3 illustrates an example of a basic service set.
Figure 4:
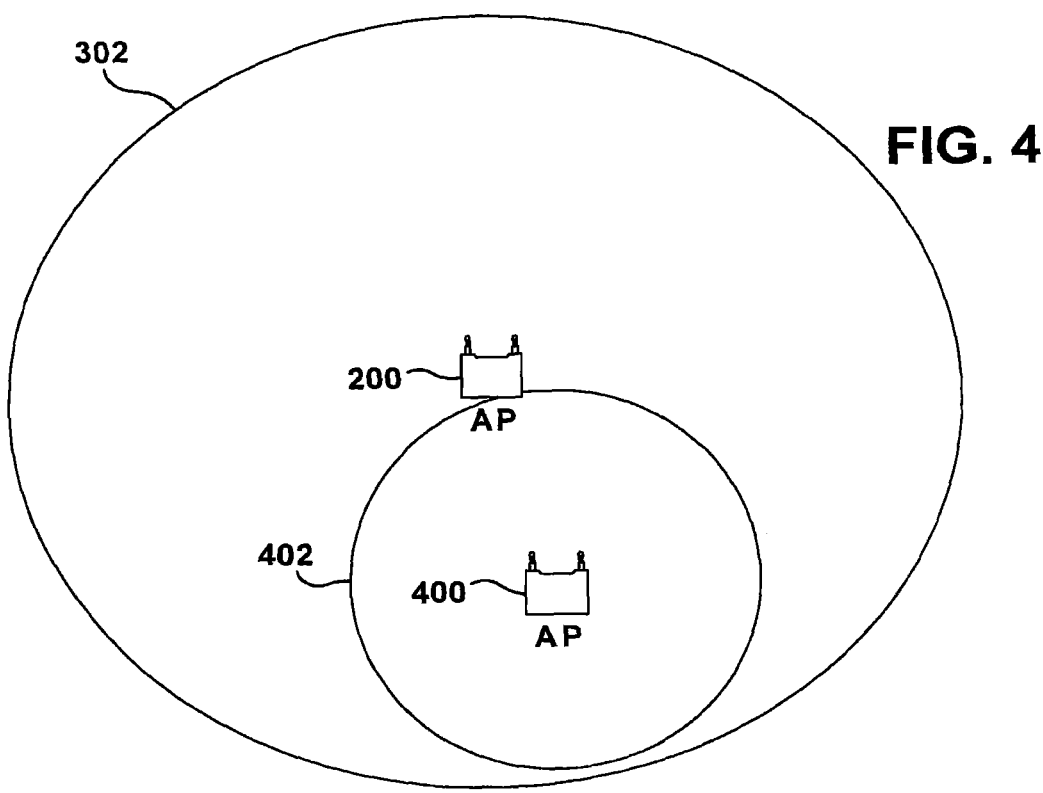
FIG. 4 illustrates an example of a basic service set in a multiple access point deployment.

Referring to FIG. 3, there is illustrated an example of a basic service set (BSS) 300 upon which an example embodiment is implemented. The BSS 300 comprises an AP 200 and a coverage area 302. Mobile nodes within coverage area 302 may associate with AP 200. As will be described in more detail herein, coverage area 302 may be varied, depending upon the operating characteristics of the network. In addition, as illustrated in FIG. 4, an area may be serviced by multiple access points. For example, a mobile node within coverage area 402 may associate with AP 400 or AP 200. In an example embodiment, AP 400 may be configured similarly to AP 200.

Figure 5:
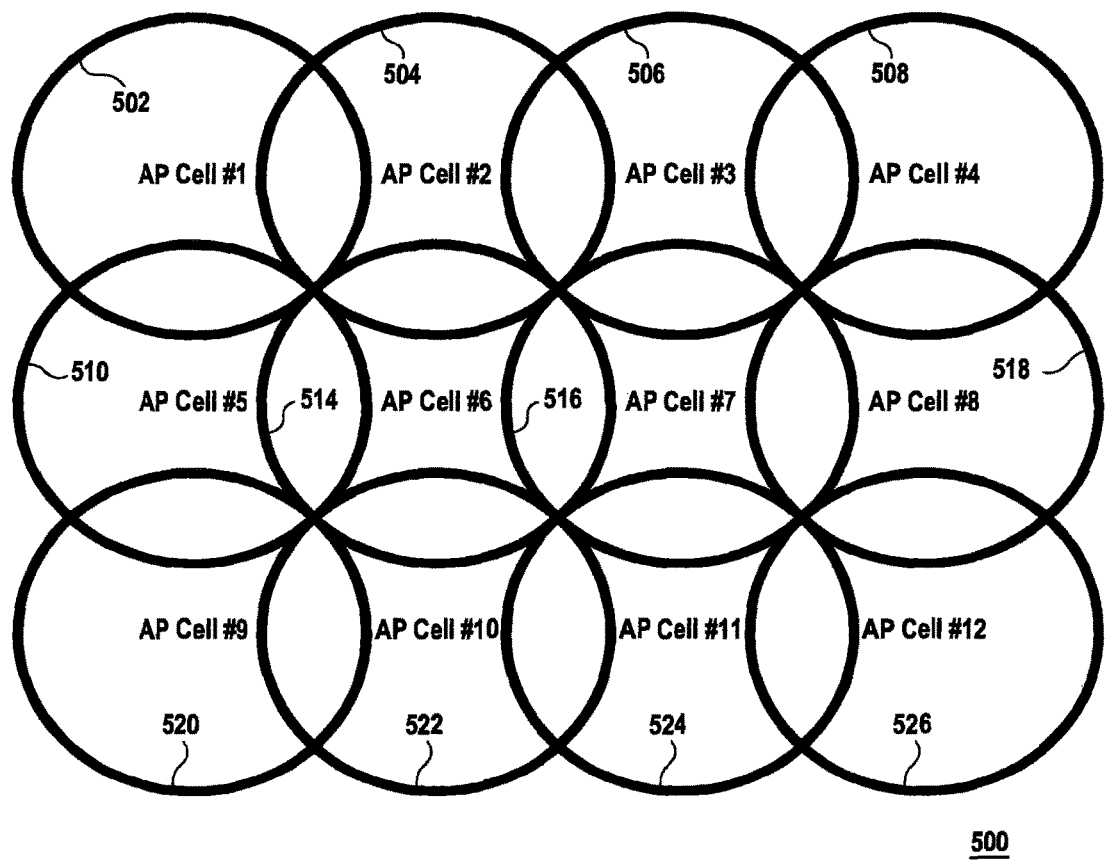
FIG. 5 illustrates an example network with low density deployment for implementing an example embodiment.

Referring to FIG. 5, there is illustrated an example network 500 with low density deployment for implementing an example embodiment. In the example illustrated in FIG. 5, there are twelve coverage areas represented as AP cell #1 502, AP cell #2 504, AP cell #3 506, AP cell #4 508, AP cell #5 510, AP cell #6 514, AP cell #7 516, AP cell #8 518, AP cell #9 520, AP cell #10 522, AP cell #11 524, and AP cell #12 526. Each cell (which may also be referred to as a basic service set) is serviced by an access point, such as access point 200 illustrated in FIG. 2. The access points servicing AP cell #1 502, AP cell #2 504, AP cell #3 506, AP cell #4 508, AP cell #5 510, AP cell #6 514, AP cell #7 516, AP cell #8 518, AP cell #9 520, AP cell #10 522, AP cell #11 524, and AP cell #12 526 can be coupled to a controller such as, for example, controller 100 illustrated in FIG. 1. In this type of deployment, which may be employed in a metro or outdoor network, a mobile device (client) may only be able to associate with a limited number of access points at a given time. For example, a client may only be able to associate with one, two, or three access points that are physically closest to the client. This type of deployment can be challenging because a mobile device may only be able to associate with one access point.

In an example embodiment, a controller is aware of what mobile devices (clients) are associated with access points. In order to save power, a controller keeps any access point having an associated client active. The controller may switch access points to power save mode based on an algorithm, such as described herein. In an example embodiment, the controller may also keep access points for cells adjacent to access points having associated clients operational in order to enhance roaming performance. In alternative embodiments, the controller switches access points for cells adjacent to access points with associated clients to power save mode to enhance power savings.

Figure 6:
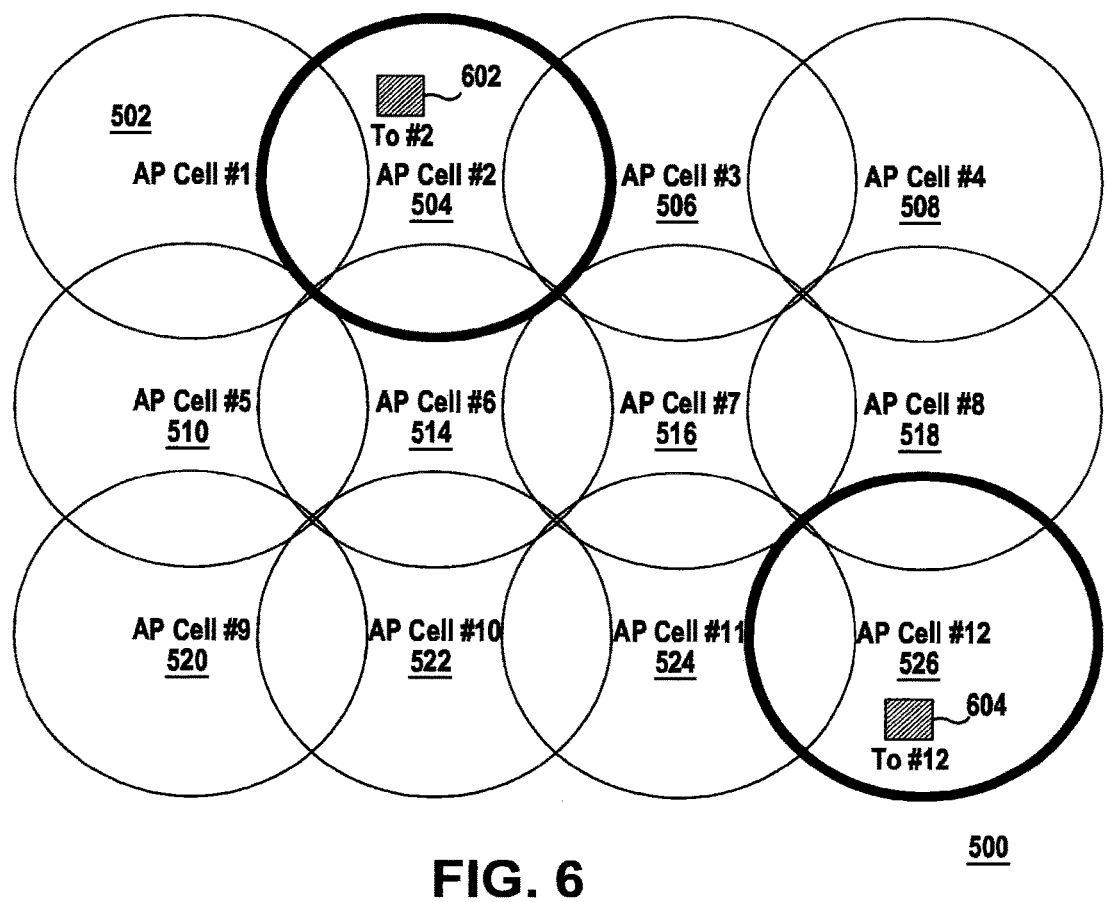
FIG. 6 illustrates an example of a network employing a power saving algorithm that enhances power savings over roaming performance.

FIG. 6 illustrates an example of network 500 configured to employ an algorithm that optimizes power savings over roaming performance. As illustrated, mobile device 602 is associated with AP Cell #2 504, and mobile device 604 is associated with AP Cell #12 526. In this embodiment, the controller keeps the APs for cells 504 and 526 operational; the APs for cells 502, 506, 508, 510, 514, 516, 518, 520, 522, and 524 are switched to power save mode. From the foregoing, only the minimum number of APs are active.

Figure 7:
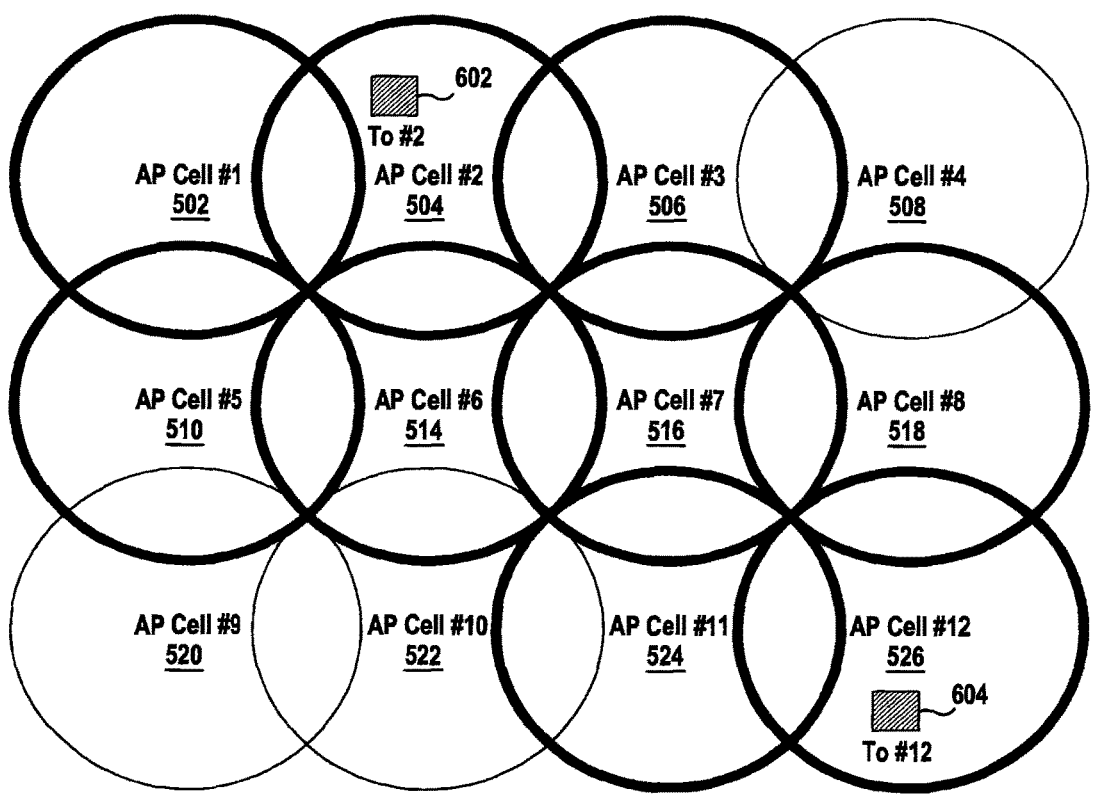
FIG. 7 illustrates an example of a network employing a power saving algorithm that enhances roaming performance over power savings.

FIG. 7 illustrates an example of network 500 configured to employ an algorithm that optimizes roaming performance over power savings. In this example, as in FIG. 6, mobile device 602 is associated with AP Cell #2 504, and mobile device 604 is associated with AP Cell #12 526. In this embodiment, however, in addition to AP cell #2 504 and AP cell #12 526 being active, AP cell #1 502, AP cell #3 506, AP cell #5 510, AP cell #6 514, AP cell #7 516, AP cell #8 518, and AP cell #11 524, each of which are adjacent to at least one of AP cell #2 504 and AP cell #12 526, are also active. In this example, AP cell #4 508, AP cell #9 520, and AP cell #10 522 are in power save mode. Therefore, although some power savings is realized, the power savings in this embodiment is less than the power savings achieved in the embodiment illustrated in FIG. 6; however, adjacent cells are active such that, if mobile device 602 or mobile device 604 roam to an adjacent cell, there will be no delays caused by waiting for an access point to switch from power save mode to operational (or active) mode.

Figure 8:
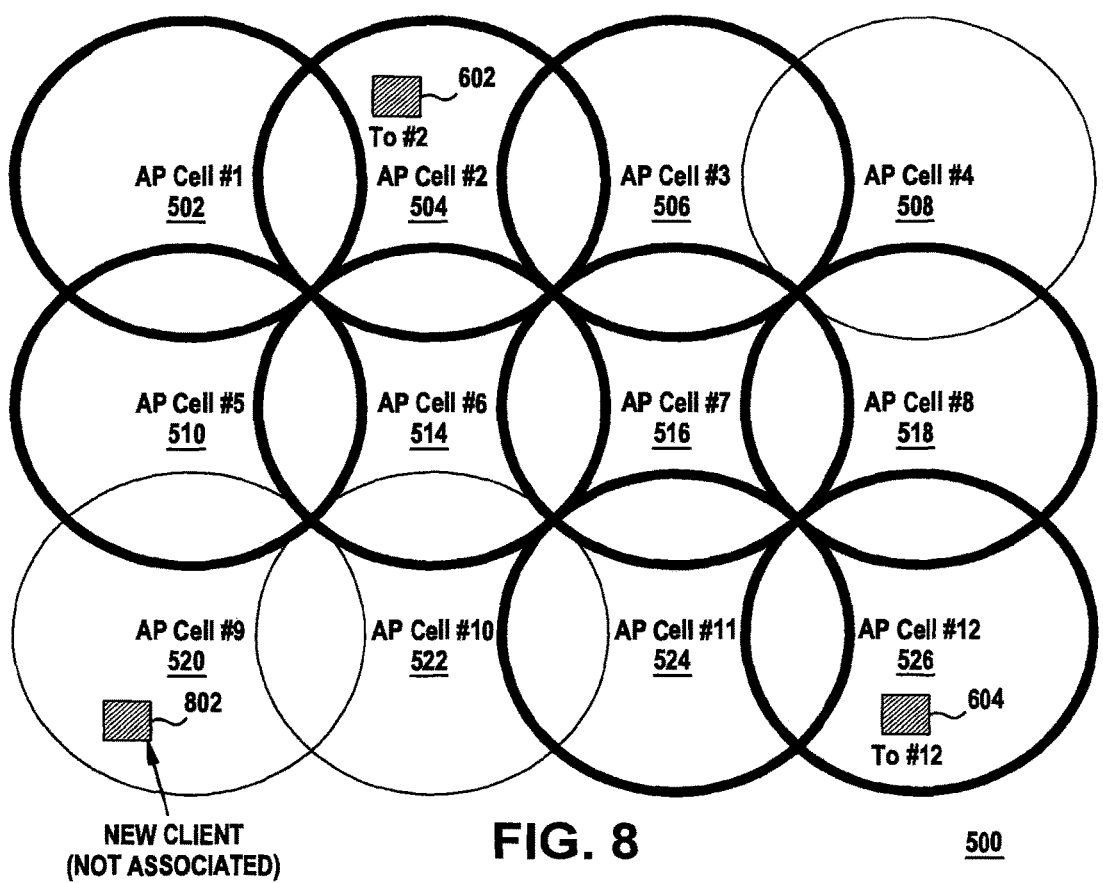
FIG. 8 illustrates an example of a round robin one-hot monitoring algorithm, wherein an unassociated client enters a cell whose access point is in power save mode.

FIG. 8 illustrates an example network 500 employing a round robin monitoring algorithm, wherein an unassociated client 802 enters a cell (e.g. AP cell #9 520) whose access point is in power save mode. In an example embodiment, the controller employs a one-hot moving monitor, wherein a single AP is taken out of sleep mode in a round-robin manner to look for new and/or unassociated mobile devices. This algorithm may be preferred in embodiments where the network is weighted towards power savings. When applied in a low density configuration, all inactive nodes (APs) are included in the round-robin scheme to ensure full coverage. In any environment, including all inactive nodes (APs) will provide maximum coverage area and minimize nulls. An example of a one-hot round robin algorithm is illustrated in FIGS. 9-12. Alternatively, N (where N is an integer greater than 1) varying nodes may be used for a monitoring algorithm. This is similar to a one-hot algorithm, except that multiple APs are simultaneously rotated to an active state to look for new and/or unassociated mobile devices. An N varying node algorithm may be used in systems that are weighted towards performance, as it would reduce the amount of latency of client association at the expense of additional power consumption.

Figure 9:
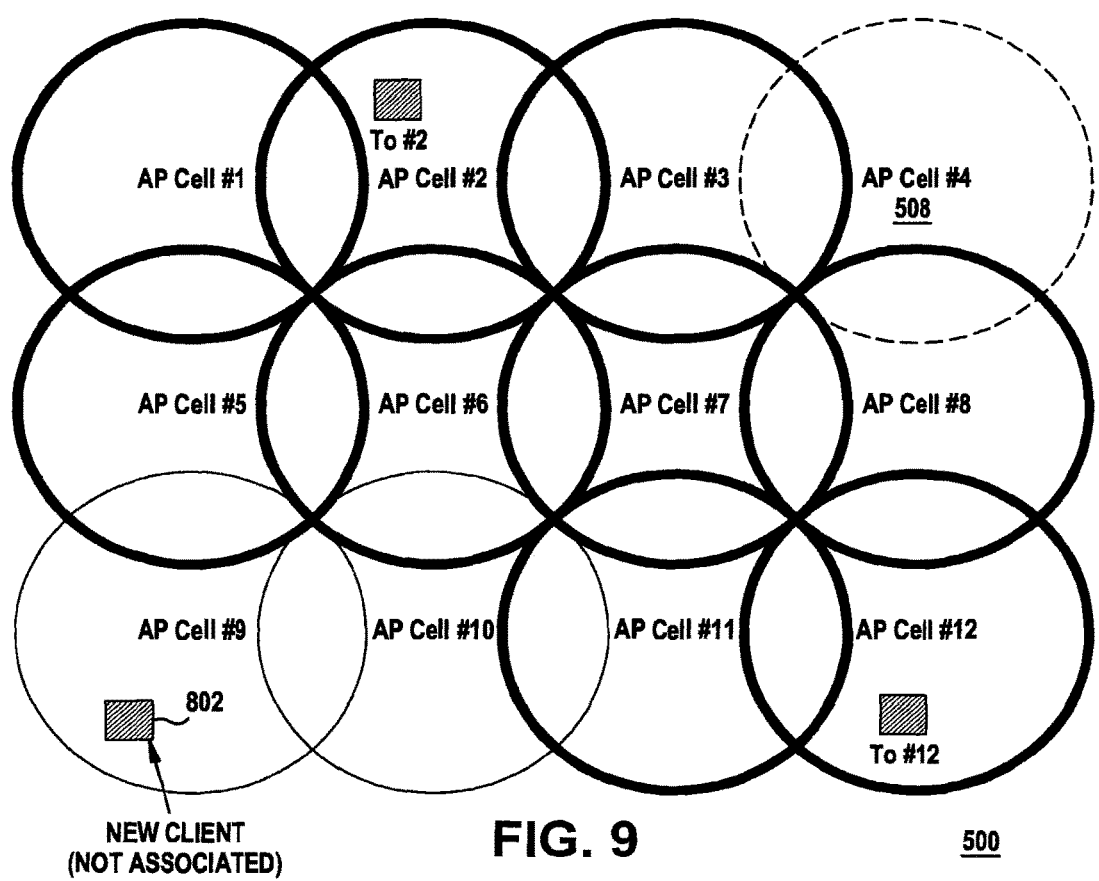
FIG. 9 illustrates the example of FIG. 8, wherein a first access point is activated to monitor for new clients.

FIG. 9 illustrates the example of FIG. 8, wherein a first access point is activated to monitor for new clients. In this example, the access point for AP Cell #4 508 is transitioned to an active/operational state. Because mobile device 802 is not in AP cell #4 508, mobile device 802 still cannot associate with the network. The AP for AP cell #4 508 returns to power save mode because it did not detect any new or unassociated mobile devices within its cell.

Figure 10:
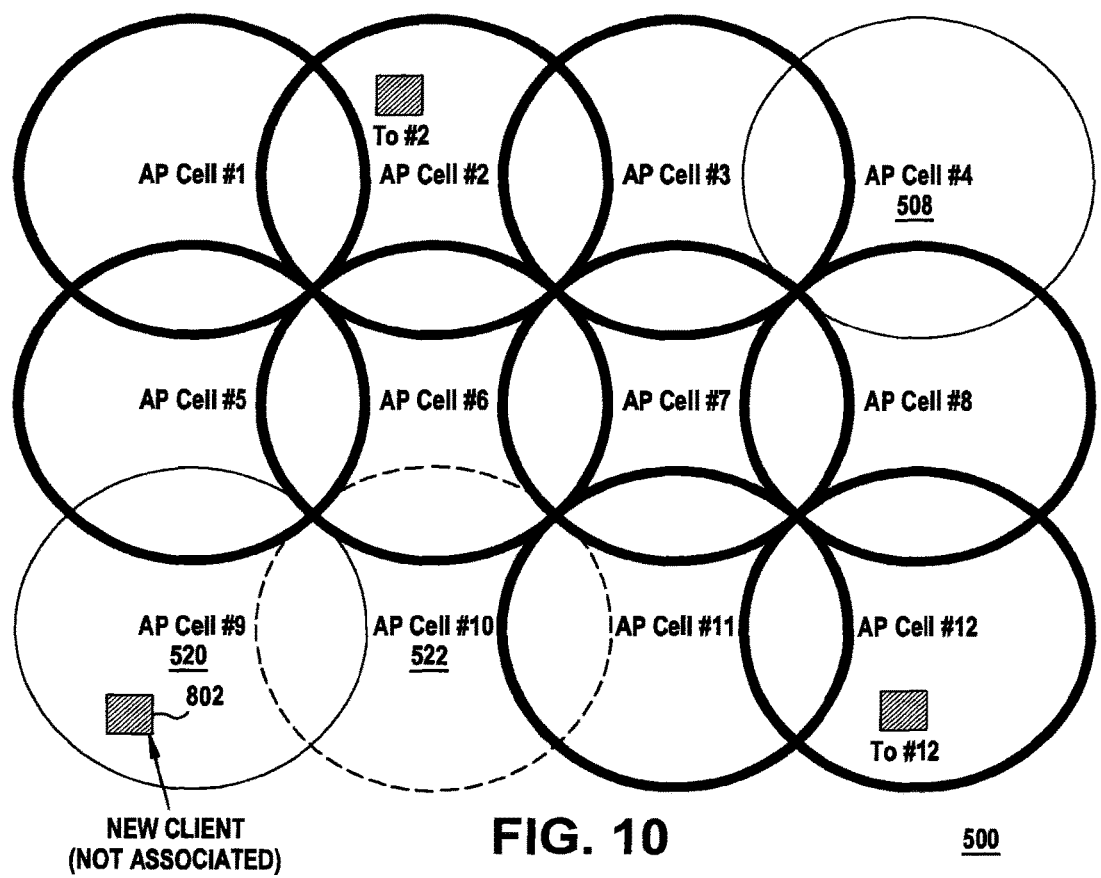
FIG. 10 illustrates the example of FIG. 8, wherein a second access point is activated to monitor for new clients.

FIG. 10 illustrates the example of FIG. 8, wherein a second access point is activated to monitor for new clients. The access point for AP cell #10 522 is activated to detect new and/or unassociated mobile devices. Because mobile device 802 is not in AP cell #10 522, mobile device 802 still cannot associate with the network. The AP for AP cell #10 522 returns to power save mode because it did not detect any new or unassociated mobile devices within its cell.

Figure 11:
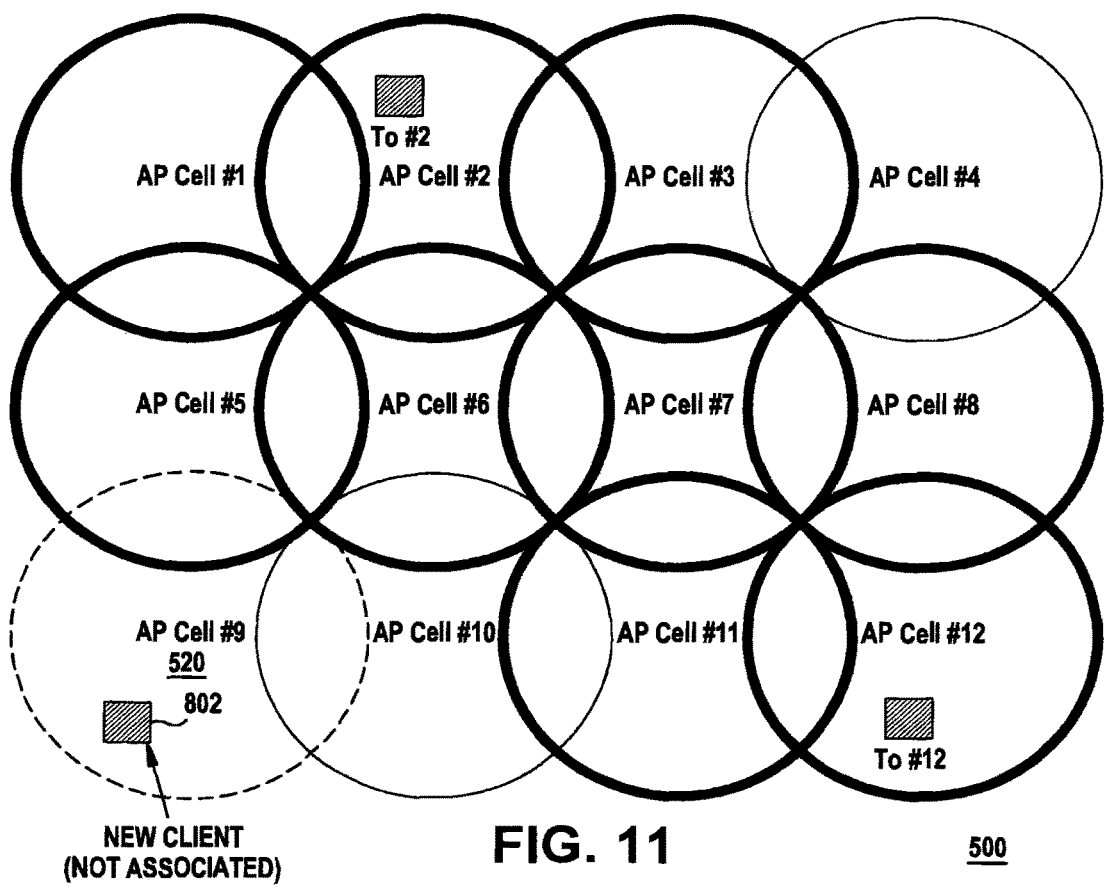
FIG. 11 illustrates the example of FIG. 8, wherein a third access point is activated to monitor for new clients and discovers the unassociated new client.

FIG. 11 illustrates the example of FIG. 8, wherein a third access point is activated to monitor for new clients and discovers the unassociated new client. The access point for AP cell #9 520 is activated and searches for new and/or unassociated mobile devices within its cell. Because mobile device 802 is within AP cell #9 520, it can now associate with the AP for AP cell #9 520 and establish a session with network 500.

Figure 12:
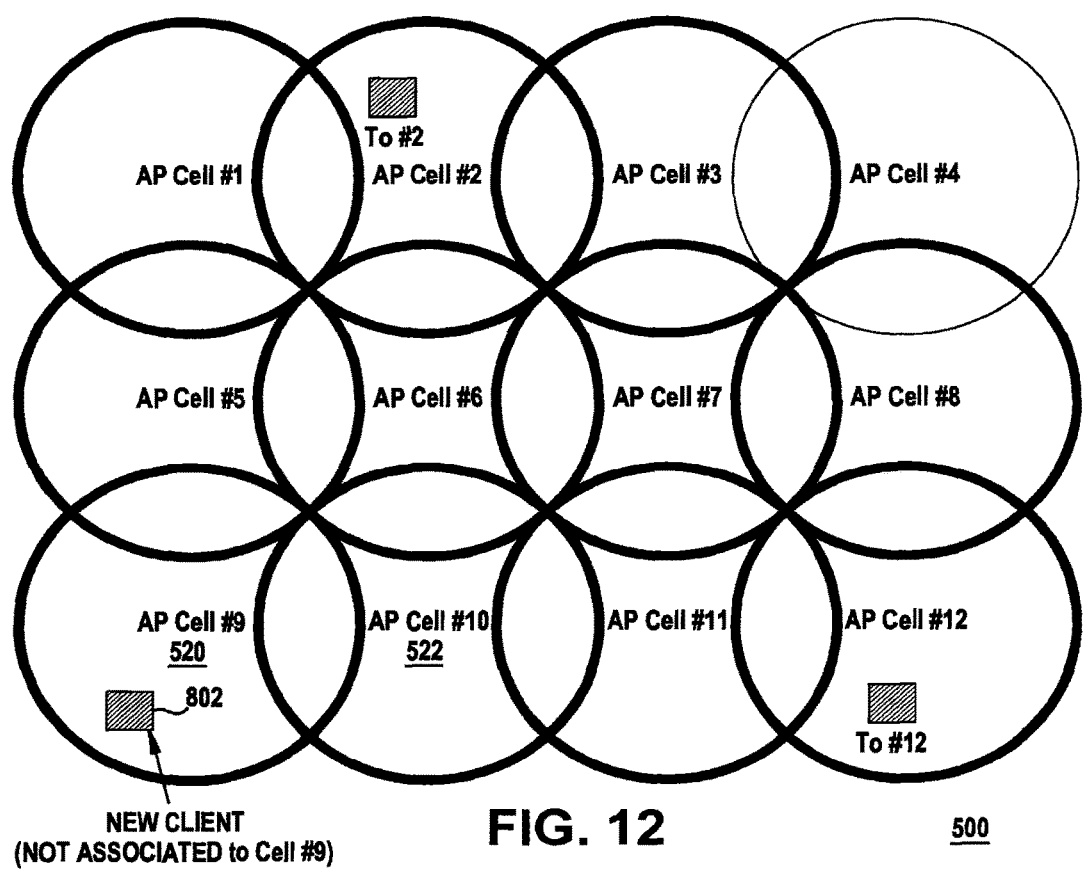
FIG. 12 illustrates the example of FIG. 8, wherein the unassociated client has associated with the previously unavailable access point and an adjacent access point is activated to enhance roaming performance.

In an example embodiment, see for example FIG. 12, after mobile device 802 has associated with the AP for AP cell #9 520, the controller activates the AP for AP cell #10 522. This can reduce latency if mobile device 802 roams to AP cell #10 522 because, as explained herein supra, there will be no delays caused by waiting for an access point to switch from power save mode to operational (or active) mode.

Figure 13:
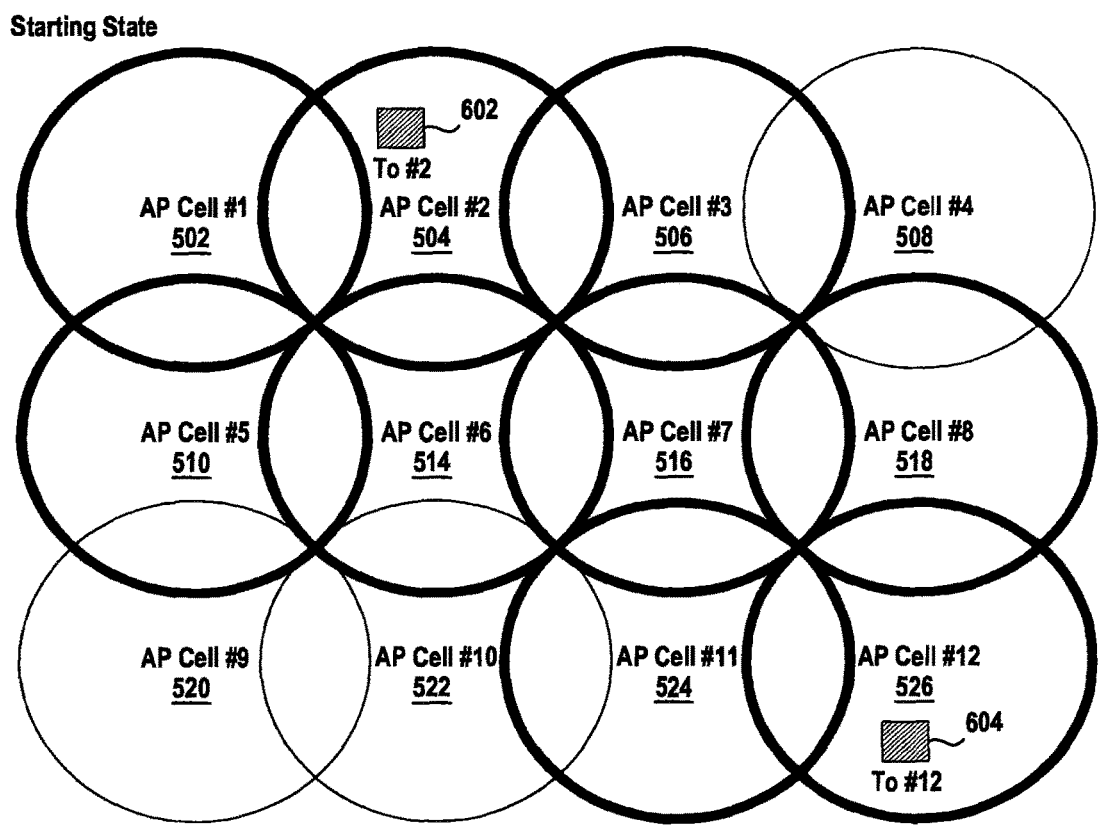
FIG. 13 illustrates an example starting state of a network prior to a mobile device roaming to an adjacent cell.
Figure 14:
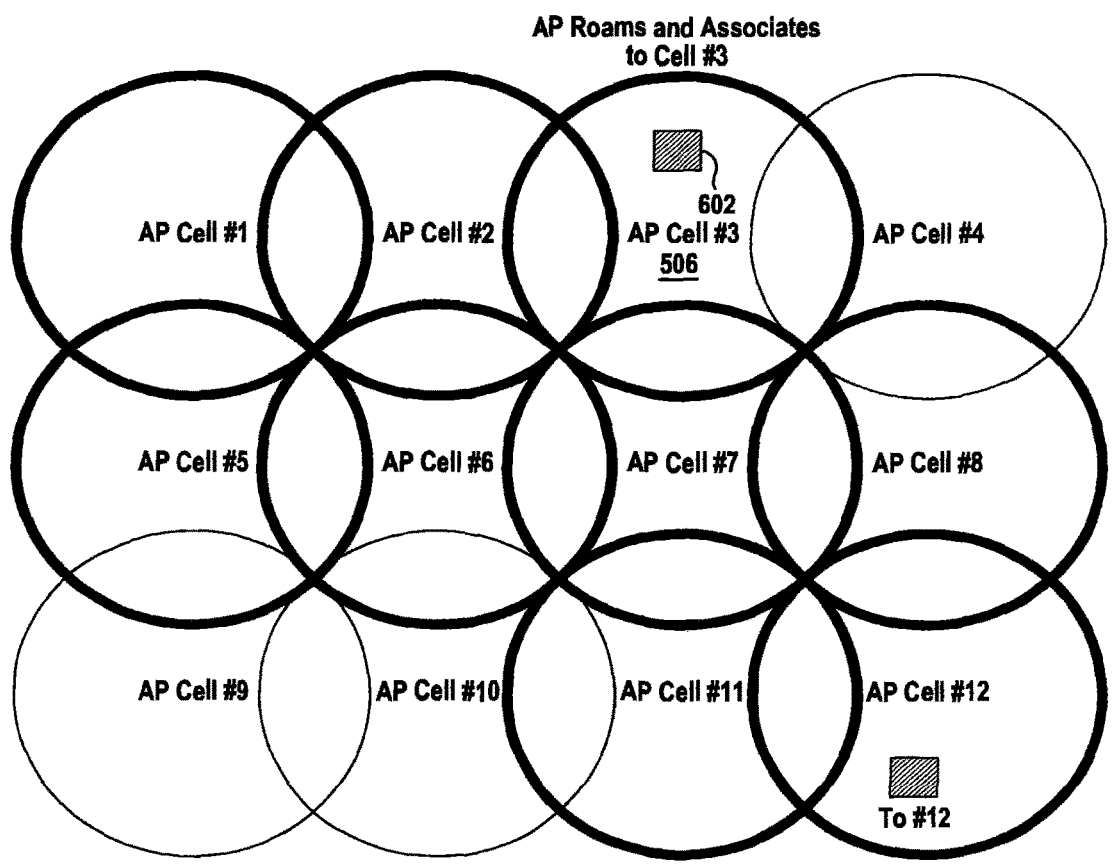
FIG. 14 illustrates the state of the network of FIG. 13 after the mobile device has roamed to an adjacent cell.
Figure 15:
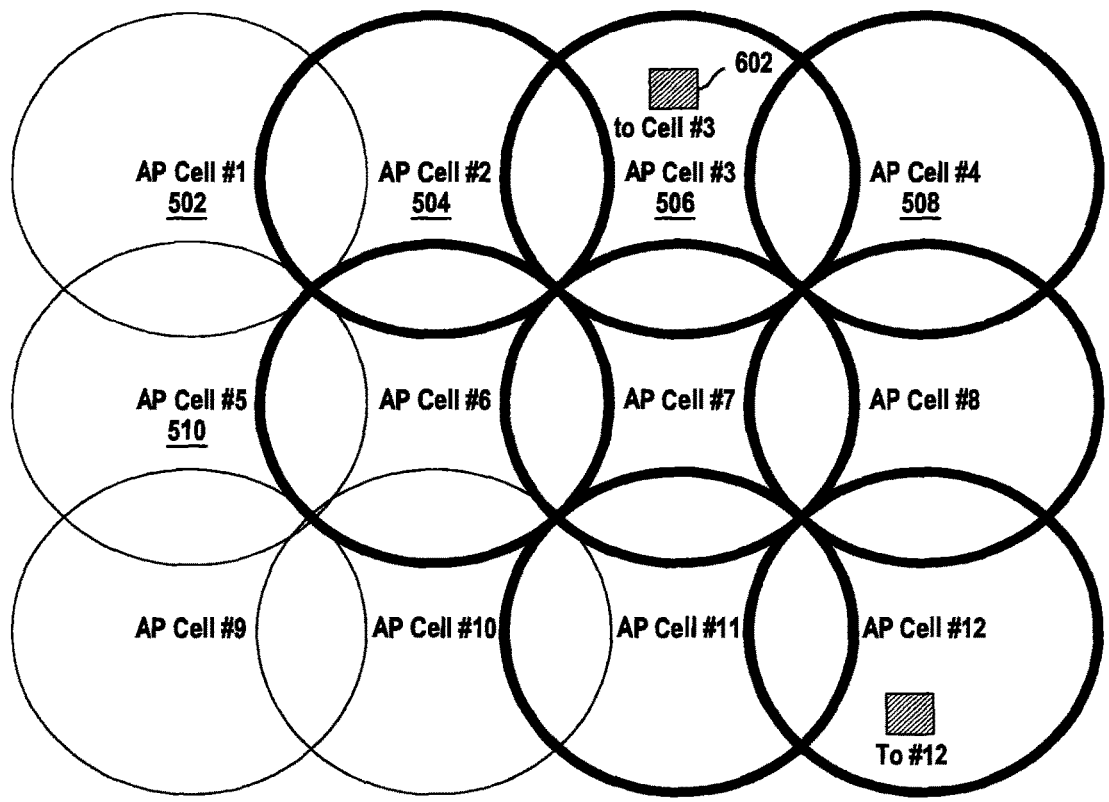
FIG. 15 illustrates the state of the network of FIG. 13 after the controller has re-configured the network in response to the mobile device roaming to an adjacent cell.

FIGS. 13-15 illustrate an example embodiment that adapts APs for adjacent cells when mobile devices roam. FIG. 13 illustrates a starting state of an example, illustrating mobile device 602 in AP cell #2 504 prior to roaming to an adjacent cell. In the current state, the access points for AP cell #1 502, AP cell #2 504, AP cell #3 506, AP cell #5 510, AP cell #6 514, AP cell #7 516, AP cell #8 518, AP cell #11 524, and AP cell #12 526 are operational, while the access points for AP cell #4 508, AP cell #9 520, and AP cell #10 522 are in power save mode.

FIG. 14 illustrates the state of the network of FIG. 13 after the mobile device 602 has roamed to an adjacent cell. In this example, mobile device 602 has roamed to AP cell #3 506.

FIG. 15 illustrates the state of the network of FIG. 13 after the controller has re-configured the network in response to mobile device 602 roaming. Because there are no longer any mobile nodes associated with the access point at AP cell #2 504, the access points in AP cell #1 502 and AP cell #5 510 are switched to power save mode. The access point in AP cell #2 504 remains operational because it is adjacent to AP cell #3 506, where mobile device 602 is currently located. The access point in AP cell #4 508 is switched to operational mode because AP cell #4 508 is adjacent to AP cell #3 506, where mobile device 602 has now roamed.

Figure 16:
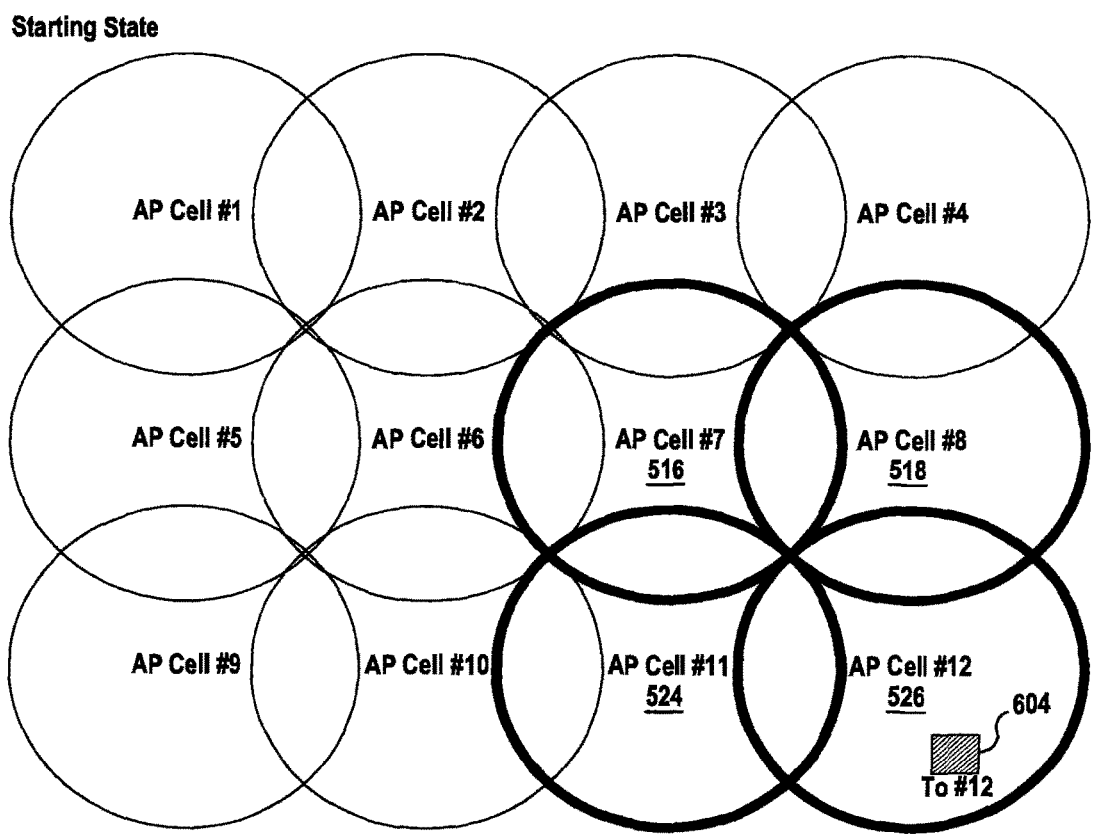
FIG. 16 illustrates the starting state of a network to illustrate a forced roam (active grouping) example.
Figure 17:
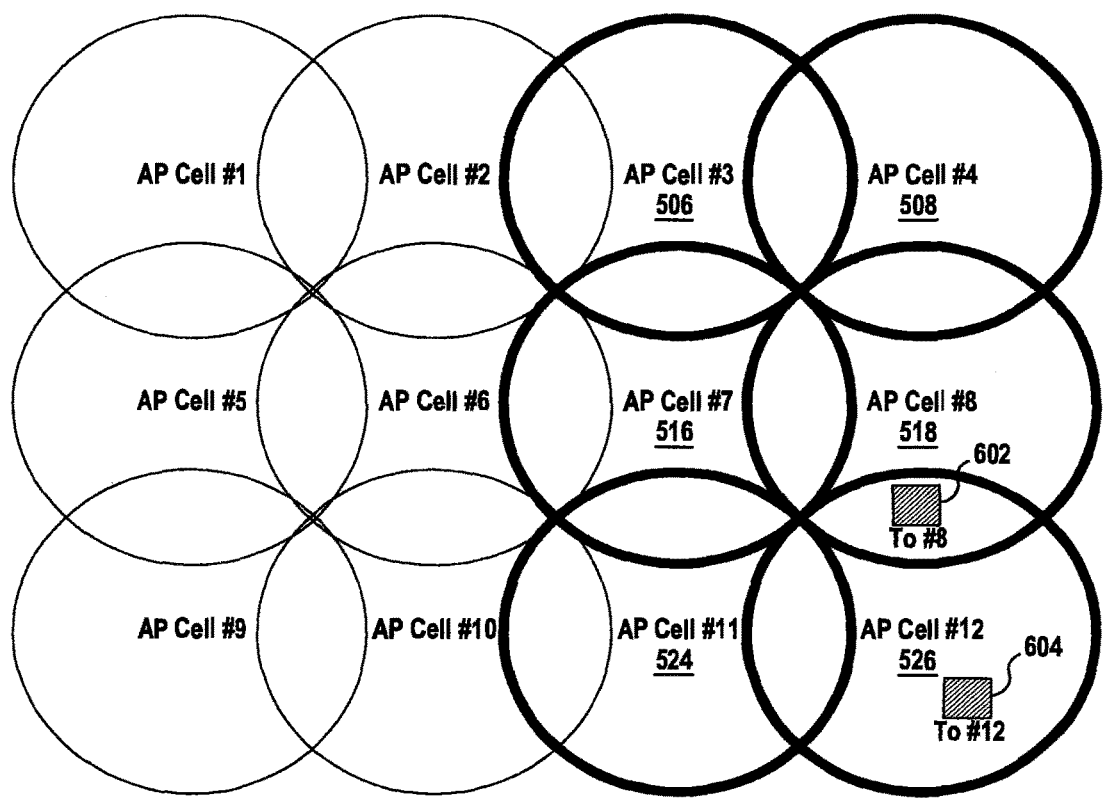
FIG. 17 illustrates the network of FIG. 16 when a mobile device is discovered in an adjacent cell.
Figure 18:
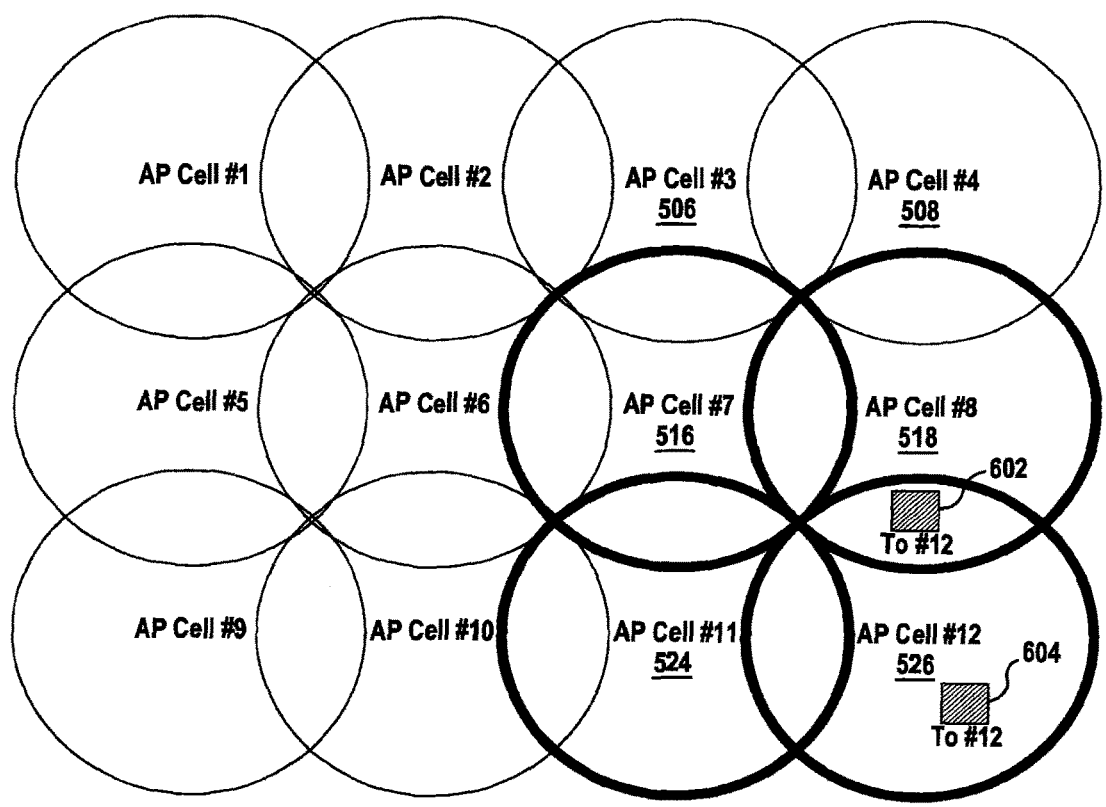
FIG. 18 illustrates the network of FIG. 16 after a forced roam (active grouping) has been performed.

FIGS. 16-18 illustrate an example where a controller performs active grouping by forcing a mobile device to roam to a specific access point. FIG. 16 illustrates the starting state of a network to illustrate a forced roam (active grouping) example. At this point, mobile device 604 is associated with the access point at AP cell #12 526. The access points in AP cell #7 516, AP cell #8 518, and AP cell #11 524 are active because they are adjacent to AP cell #12 526. The access points in AP cell #1 502, AP cell #2 504, AP cell #3 506, AP cell #4 508, AP cell #5 510, AP cell #6 514, AP cell #9 520, and AP cell #10 522 are in power save mode.

FIG. 17 illustrates the network of FIG. 16 when mobile device 602 is discovered in an adjacent cell, AP cell #8 518. The access points in AP cell #3 506 and AP Cell #4 508 are activated because these cells are adjacent to AP cell #8 518. The controller can determine whether mobile device 602 can be serviced by the access point in AP cell #12 526 and/or whether mobile device 604 can be serviced by the access point in AP cell #8 518. In this example, mobile device 602 is in an area covered by both AP cell #8 518 and AP cell #12 526. Therefore, the controller can instruct (force) mobile device 602 to roam to the access point at AP cell #12 526.

FIG. 18 illustrates the network of FIG. 16 after a forced roam (active grouping) of mobile device 602. Because mobile device 602 is now associated with AP cell #12 526, the access points in AP cell #3 506 and AP cell #4 508 can be switched to power save mode because they are no longer adjacent to a cell with an associated mobile device.

For a multi-density capable deployment, an algorithm can be employed that dynamically increases and/or decreases cell size by adjusting transmit power (and optionally clear channel assessment "CCA" and start of packet "SOP" thresholds). When a multi-density capable network is in normal operation (for example, during the standard work day) all access point cells are active with configuration settings consistent for a "small cell." AP transmit (TX) power is turned down, and CCA and SOP thresholds are optionally adjusted higher. The effect is that the number of cells present is maximized, and interference between cells is minimized. Thus, maximum throughput for a maximum number of clients is provided.

When a multi-density capable network is in 'sleep mode' (for example, outside of normal working hours or when a low amount of network activity is detected), some access points (and their corresponding cells) are turned off, and active access point cells are configured for increased coverage areas. For example, TX power may be increased and, optionally, CCA and SOP thresholds may be adjusted lower. The effect is that fewer access points are now active. Full floor plan coverage, however, is still provided to detect new clients (thus obviating the need for monitoring algorithms, as illustrated for a low density deployment). The total network throughput is scaled down since a lower number of clients are being serviced; hence, lower throughput should be sufficient.

If additional traffic needs (for example, more clients or current clients require increased network services) are detected, cell size density at appropriate locations in the network can be dynamically adjusted. In a simple implementation, the approximate center of network activity can be determined by which access points have clients associated with them. A more complex algorithm can use location information (which can be determined using received signal strength indication (RSSI), Time Difference of Arrival (TDOA), Angle of Arrival (AOA), etc.) to determine which additional cells to activate and how to adjust cell size accordingly. In an example embodiment, in addition to determining which cells to activate, the controller or device implementing the power save algorithm determines the best channel for each cell to operate so as to minimize interference with adjacent cells.

Figure 19:
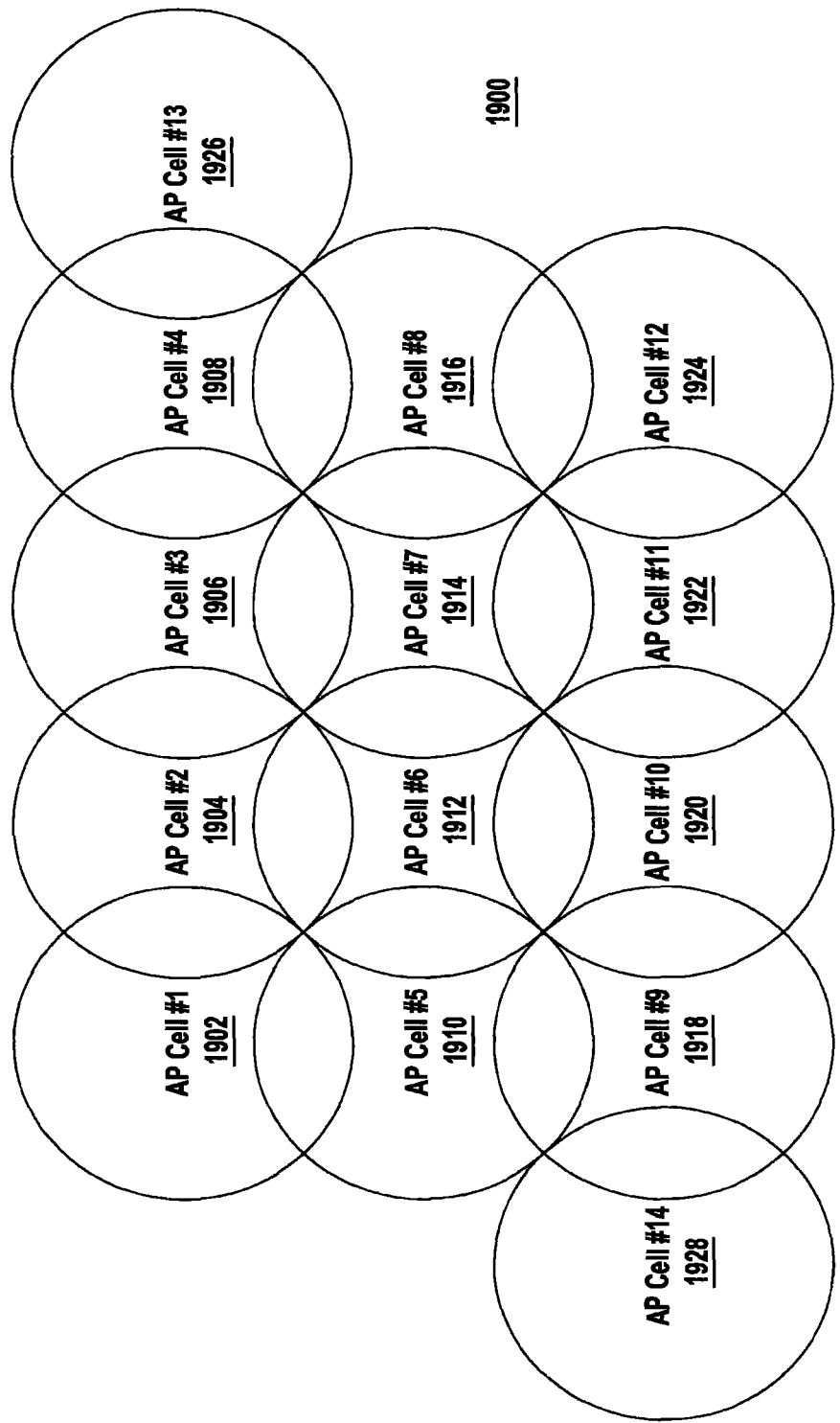
FIG. 19 illustrates an example of a multi-density network deployment upon which an example embodiment can be implemented.

FIG. 19 illustrates an example of a multi-density network deployment 1900, upon which an example embodiment can be implemented. In this example, network 1900 comprises fourteen access points: AP cell #1 1902, AP cell #2 1904, AP cell #3 1906, AP cell #4 1908, AP cell #5 1910, AP cell #6 1912, AP cell #7 1914, AP cell #8 1916, AP cell #9 1918, AP cell #10 1920, AP cell #11 1922, AP cell #12 1924, AP cell #13 1926, and AP cell #14 1928. Although the example illustrated in FIG. 19 illustrates a network with fourteen access points, those skilled in the art should readily appreciate that aspects of the example embodiments described herein are suitable for implementation on networks having any physically realizable number of access points. In normal operation, wherein no access points are in power save mode, all fourteen access points are in active mode.

Figure 20:
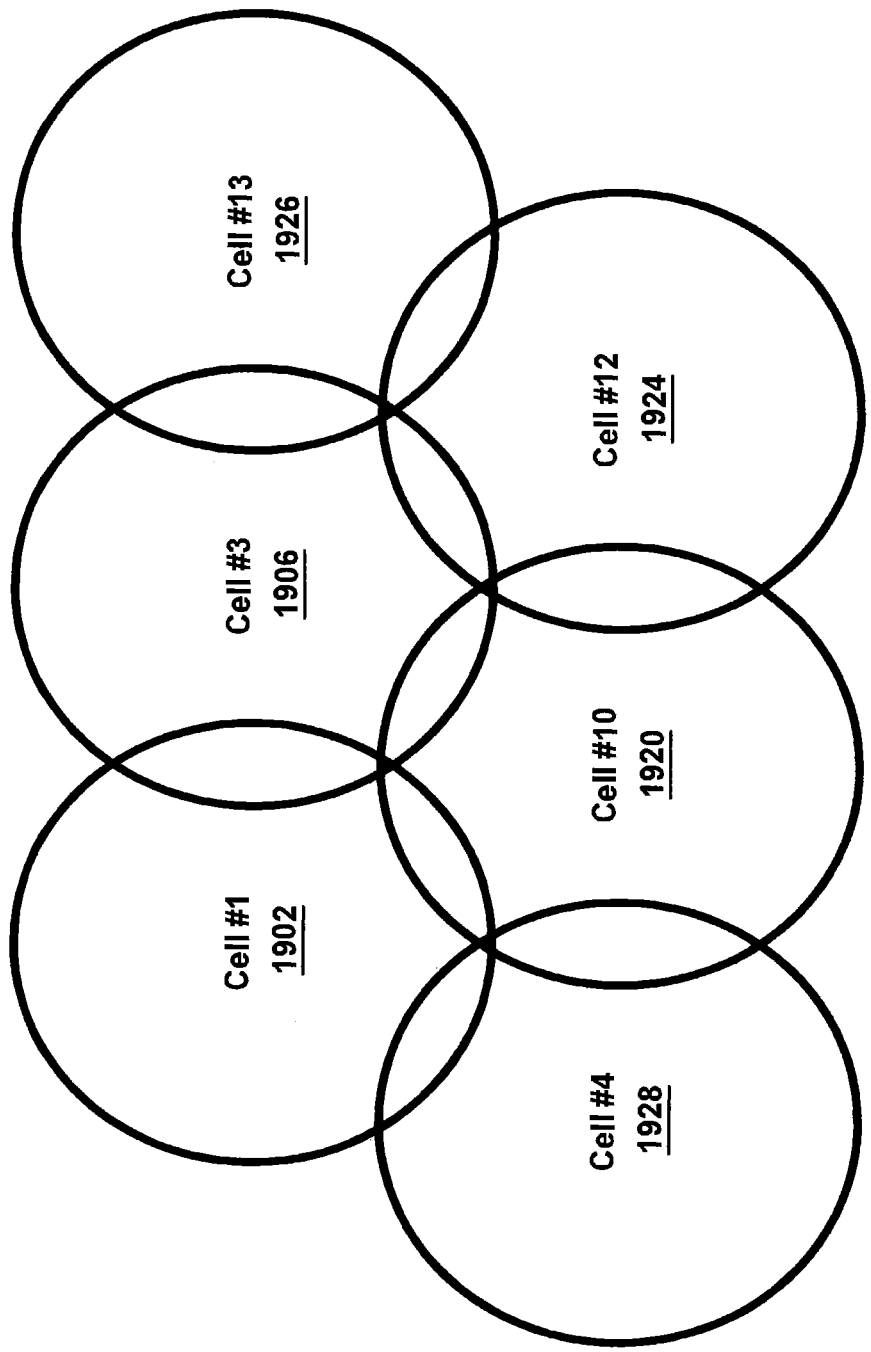
FIG. 20 illustrates an example of the multi-density network of FIG. 19 operating in a power save mode.

In an example embodiment, for example an 802.11 network where in normal mode the transmit powers of the radios are less than maximum and optionally start of packet (SOP) and clear channel assessment (CCA) thresholds are increased, which is typical of an enterprise deployment employing a "pico-cell" architecture, a low power mode can be entered wherein some of the access points enter a, power save (e.g. "sleep") mode and the remaining active access points increase their transmit power and, optionally, decrease SOP and CCA thresholds, thus increasing their cell sizes to cover the areas of the access points in power save mode. FIG. 20 illustrates an example of this. In the example of FIG. 20, the access points for AP cell #1 1902, AP cell #3 1906, AP cell #13 1926, AP cell #14 1928, AP cell #10 1920, and AP cell #12 1924 increase their coverage areas by either increasing transmit power and/or decreasing SOP and CCA thresholds, while the access points for cells AP cell #2 1904, AP cell #4 1908, AP cell #5 1910, AP cell #6 1912, AP cell #7 1914, AP cell #8 1916, AP cell #9 1918, and AP cell #11 1922 are in power save mode. Note that the APs in power save mode are not shown in FIG. 20.

Figure 21:
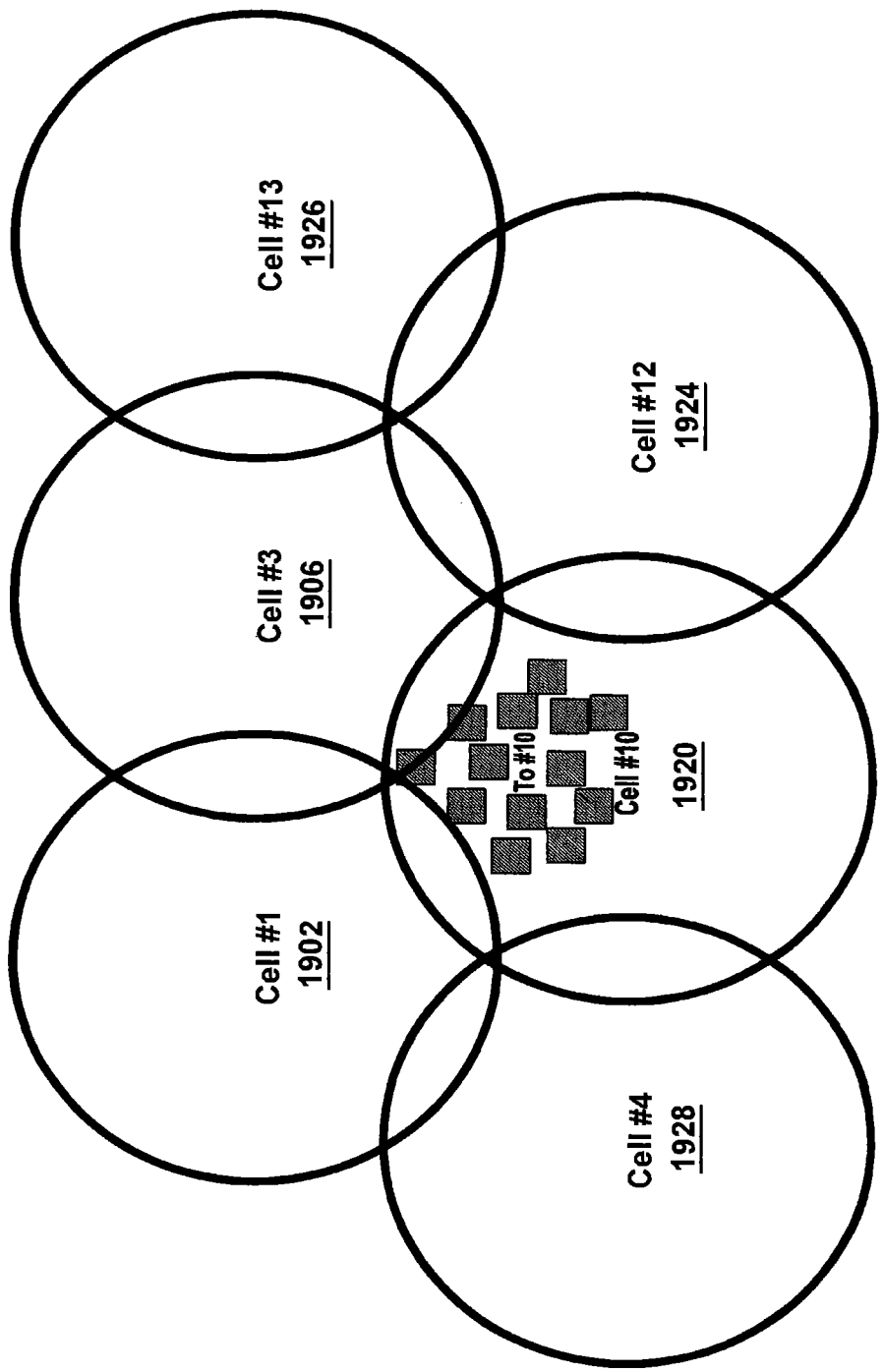
FIG. 21 illustrates an example of the multi-density network of FIG. 19 operating in the power save mode illustrated in FIG. 20 with new client associations.
Figure 22:
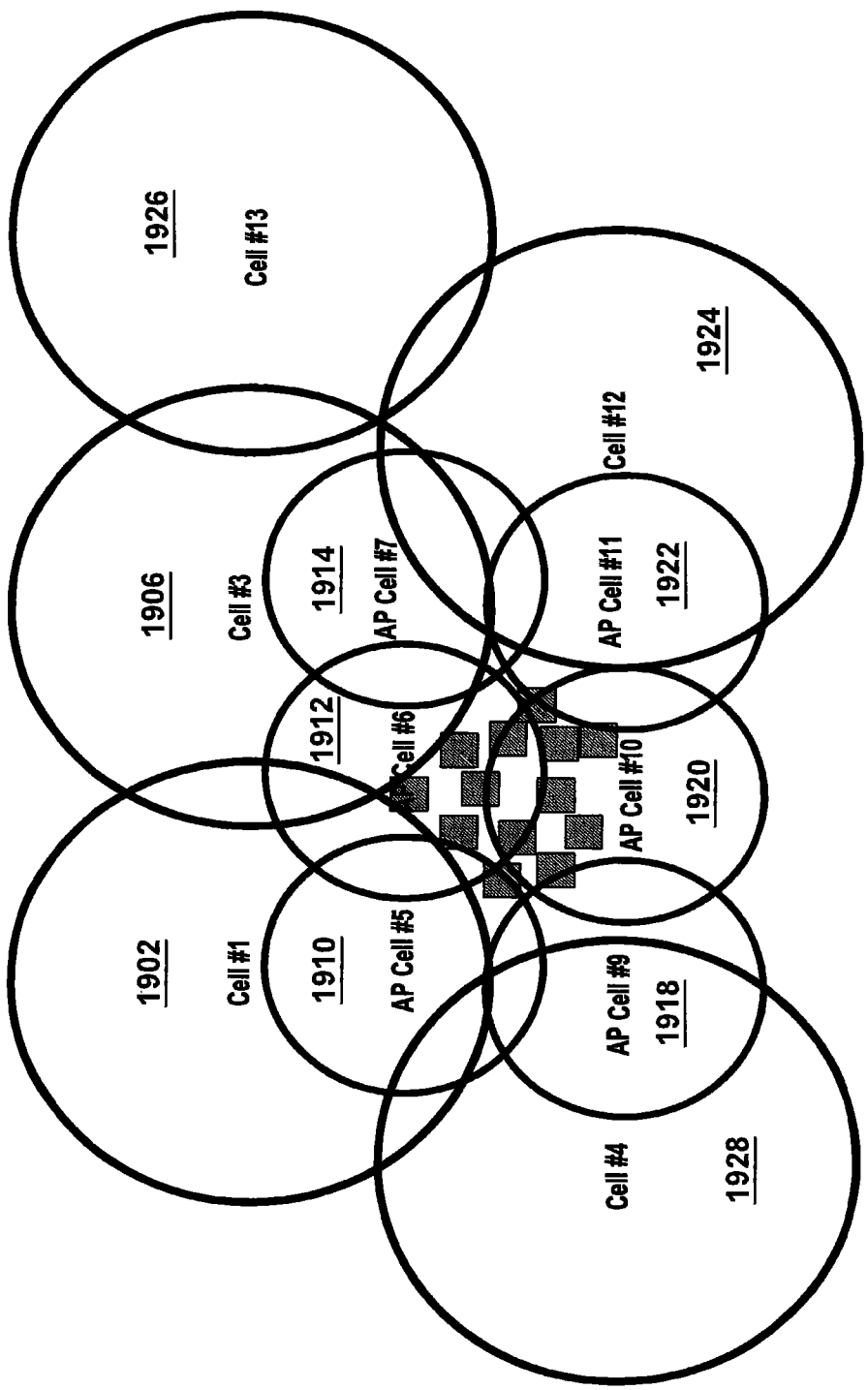
FIG. 22 illustrates the multi-density network of FIG. 19 operating in power save mode, compensating for new client associations.

If the controller observes a number of mobile devices (clients) associating to one or more cells while some access points are in power save (sleep) mode, the controller may switch additional access points into operational mode. For example, as illustrated in FIG. 21, thirteen mobile devices associate with the access point for AP cell #10 1920. Such a scenario may occur if a meeting is held before hours, after hours, or during a holiday or weekend day. If the controller recognizes there is a need for more bandwidth capacity in the area of cell #10 1920, the controller can activate access points adjacent to cell #10 1920. The controller may also reduce the transmit power (and/or increase SOP and/or CCA thresholds) of the access point for AP cell #10 1920, as well as using a lower transmit power (and/or higher SOP and/or CCA) for the adjacent cells. This is illustrated in FIG. 22. In FIG. 22, the access points for AP cell #5 1910, AP cell #6 1912, AP cell #7 1914, AP cell #9 1918, and AP cell #11 1922 are activated, and the coverage area for the access point of AP cell #10 1920 is reduced. For example, the controller may employ a load balancing algorithm for assigning clients to access points. In addition, this technique allows the load from the clients to be distributed among several access points, while at the same time realizing some power saving benefits. For example, in FIG. 22 there are still three access points in power save mode after the additional access points are activated to service the increased load.

Figure 23:
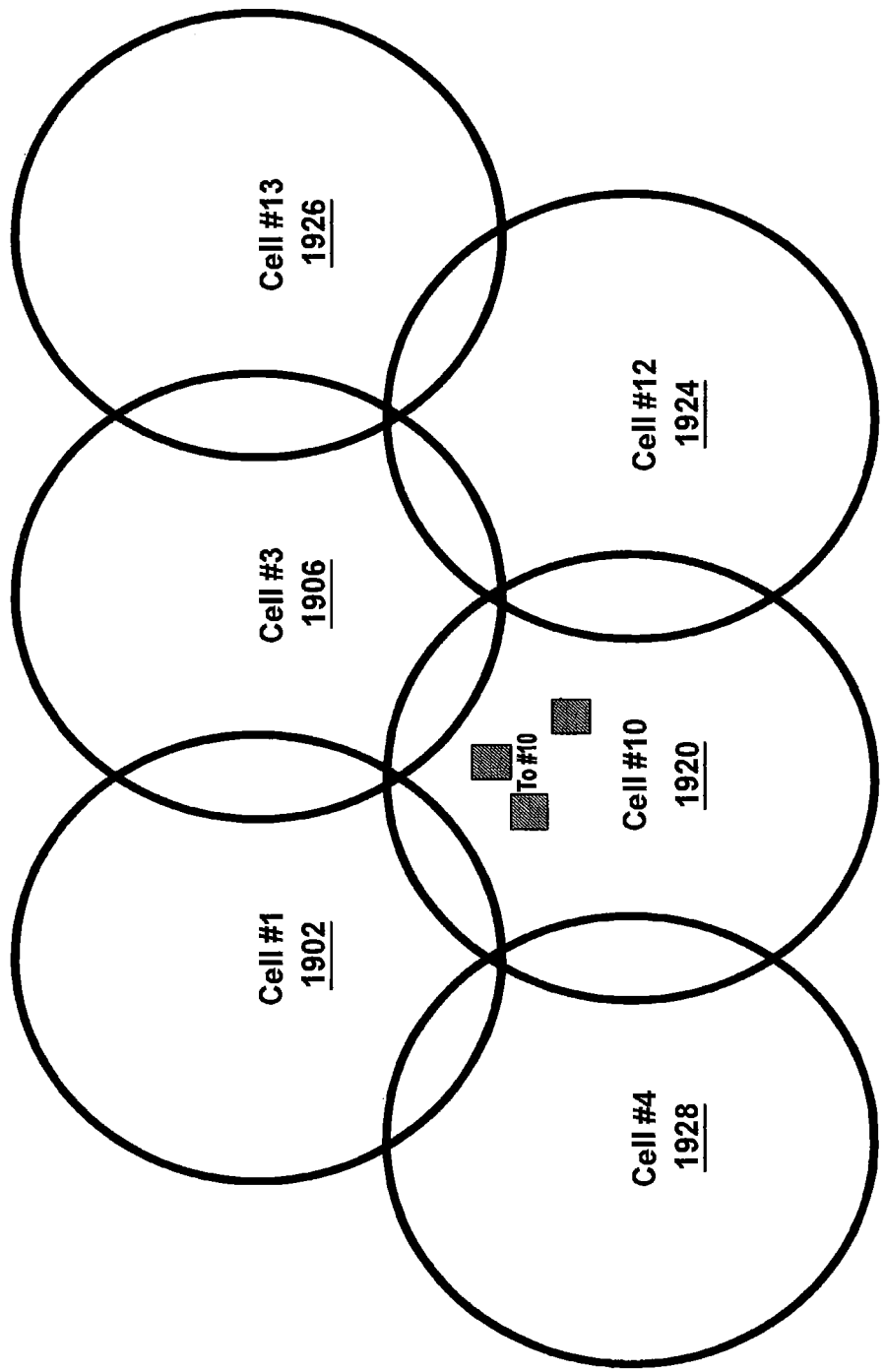
FIG. 23 illustrates the multi-density network of FIG. 19 operating in power save mode, adjusting for clients leaving the network.

If the controller observes the number of mobile devices (clients) within an area decreasing, the controller may switch access points to power save mode and increase the coverage areas of one of the adjacent cells to compensate for the access points in power save mode. For example, if in FIG. 22 a meeting ends and the mobile devices leave the network, the controller can begin to transition access points to power save mode. As illustrated in FIG. 23, only three mobile devices remain in the network. The controller switches the access points for AP cell #5 1910, AP cell #6 1912, AP cell #7 1914, AP cell #9 1918, and AP cell #11 1922 to power save mode (not shown), while increasing the coverage area of the access point for AP cell #10 1920. The coverage area for the access point of AP cell #10 1920 may be increased by increasing the transmit power, decreasing the SOP, and/or decreasing the CCA for the access point. Thus, in the example of FIG. 23, six of the fourteen access points are active, and eight of the fourteen access points are in power save mode.

Figure 24:
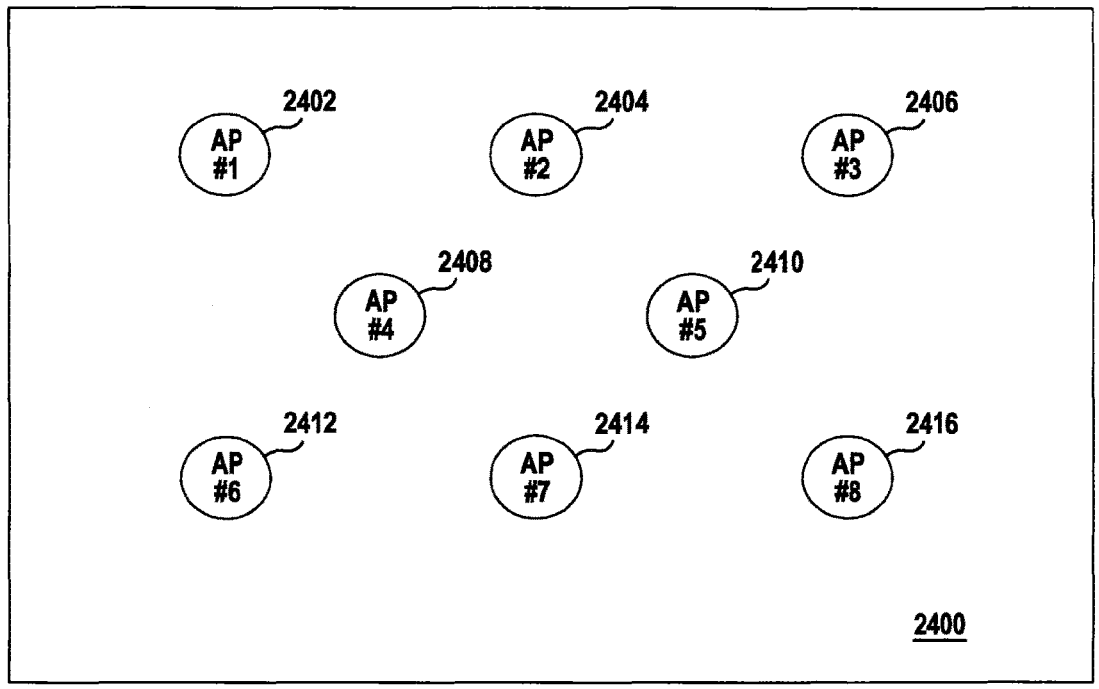
FIG. 24 illustrates an example of a high density network deployment operating in normal mode.
Figure 25:
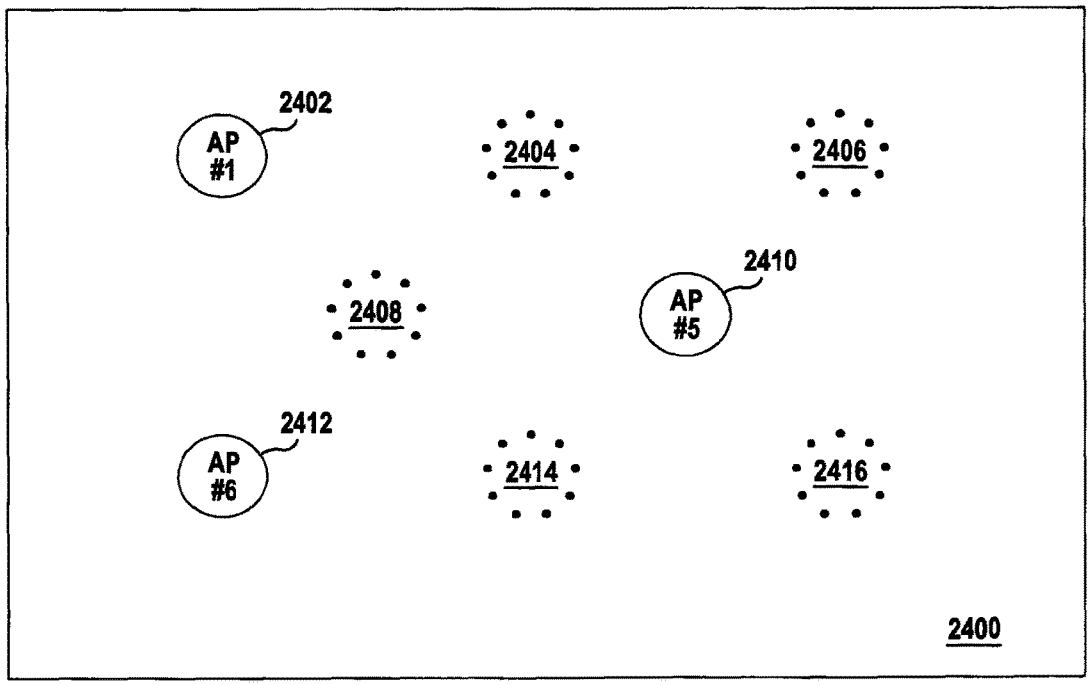
FIG. 25 illustrates the high density network of FIG. 24 operating in an N-fixed node monitoring embodiment.
Figure 26:
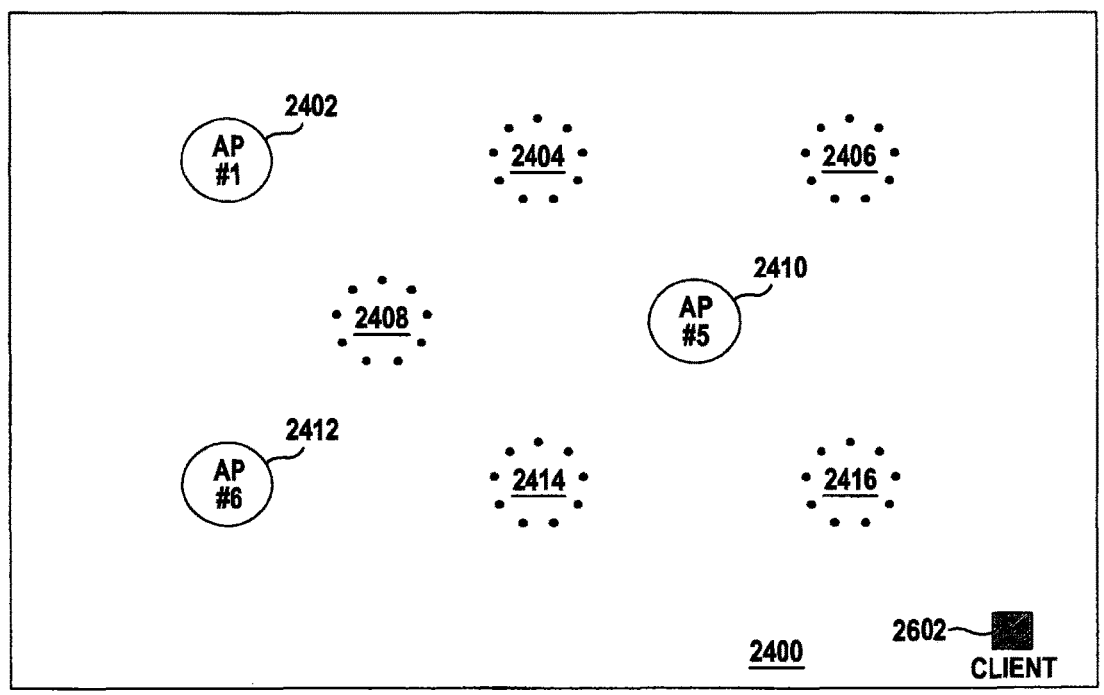
FIG. 26 illustrates an example of a new client moving into the area of the network of FIG. 24 when operating in the power save mode illustrated in FIG. 25.

FIGS. 24-26 illustrate an example of a monitoring algorithm for a high density deployment. In this example embodiment, a mobile device (client) can associate with a number of access points at a given time. A client can potentially link to many access points in the network; however, linking to a physically close AP usually provides the highest throughput due to larger signal-to-noise ratio (SNR), thus allowing for higher data rates. In the high density deployment illustrated in FIG. 24, a client anywhere within area 2400 can link with any of access points AP #1 2402, AP #2 2404, AP #3 2406, AP #4 2408, AP #5 2410, AP #6 2412, AP #7 2414, and AP #8 2416. For the reasons just set forth, it is usually desirable for a client to link to a closer AP where SNR will be lower and, consequently, data rates and throughput will be higher. While in power save operation, a controller selects a number (N) of access points to remain active to monitor for mobile devices (clients) entering the network. FIG. 25 illustrates an example for N=3. The controller selects three access points to remain active. In this example, AP #1 2402, AP #5 2410, and AP #6 2412 are left in an active state, while access points AP #2 2404, AP #3 2406, AP #4 2408, AP #7 2414, and AP #8 2416 are in power save mode. Each of the active access points AP #1 2402, AP #5 2410, and AP #6 2412 can provide coverage within area 2400. Additional access points may remain active to account for potential gaps in coverage area at a cost of power savings benefits. In the example of FIG. 25, three access points remain active, which help account for null coverage areas at the cost of a power savings penalty that would be realized for N=1 or N=2.

FIG. 26 illustrates an example of a new client 2602 (mobile device) entering area 2400 covered by the high density deployment. As client 2602 enters area 2400, client 2602 will scan channels and listen for beacons; in the example N=3 configuration, client 2602 would receive beacons from AP #1 2402, AP #5 2410, and AP #6 2412. In an example embodiment, client 2602 selects the AP with the strongest signal strength, which would be AP #5 2410 in this example.

After client 2602 associates with AP #5 2410, the controller acquires information about the link between client 2602 and AP #5 2410, such as RSSI and data rate. The controller may activate neighboring access points to determine whether a better link (e.g. higher throughput and/or lower SNR) can be established. In an example embodiment, the controller employs an active grouping algorithm, wherein the controller will attempt to move a client to the closet AP to acquire the highest throughput. In another example embodiment, the controller enables access points adjacent to the access point associated with the client 2602 so as to provide alternate access points for client 2602.

In an example embodiment, active clients such as client 2602 are moved to optimize link throughput. Techniques to determine whether another access point would provide a better link include, but are not limited to, measuring RSSI or any other measure of signal quality, RSSI based on location, TDOA based on location, or trial-and-error. In an example embodiment where the controller is configured with location determination logic, the controller can determine the location of client 2602 and activate access point cells where client 2602 is located.

Figure 27:
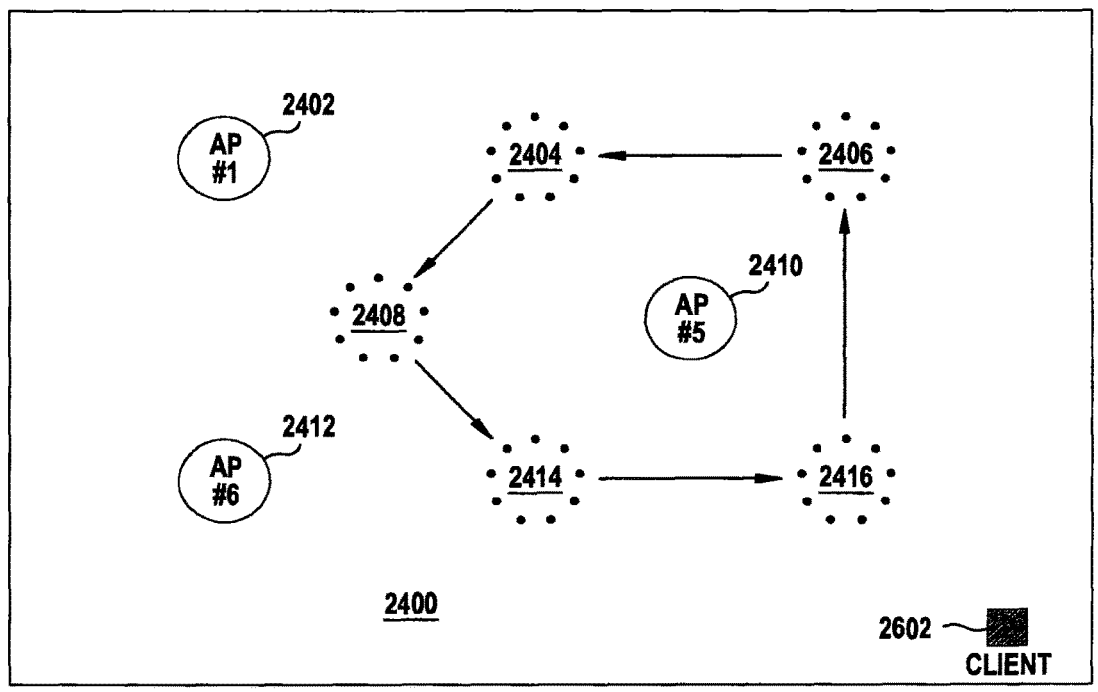
FIG. 27 illustrates an example of a trial-and-error active grouping concept for the network illustrated in FIG. 24, operating in a power save mode responsive to a new client associating with the network.
Figure 28:
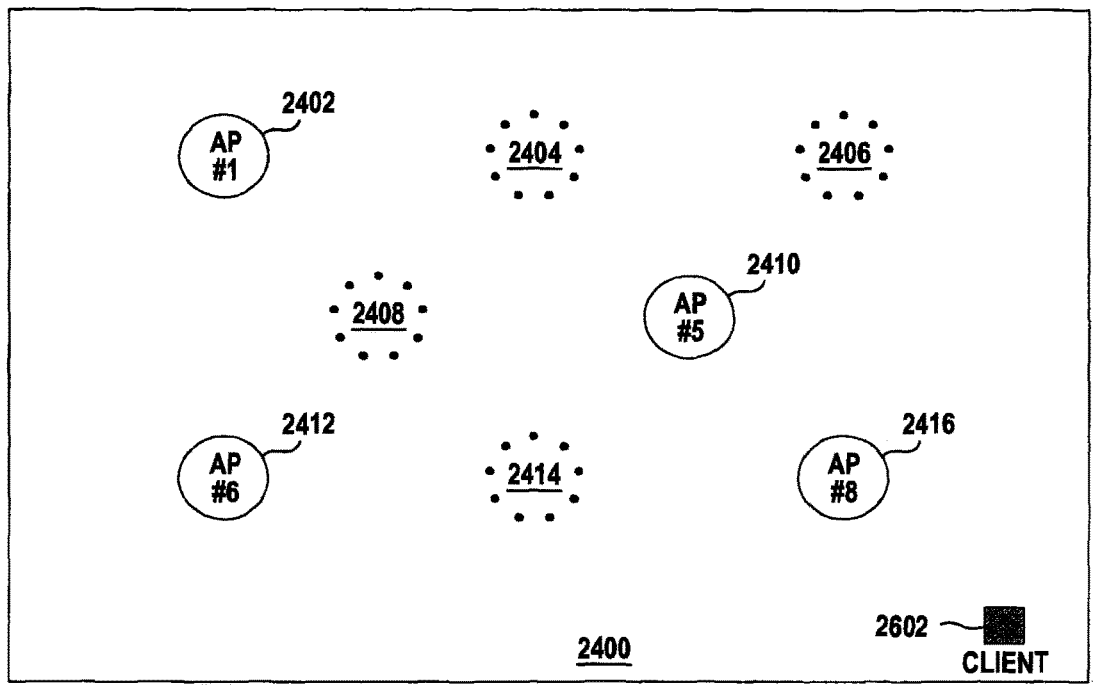
FIG. 28 illustrates an example of the network illustrated in FIG. 24 after the trial-and-error active grouping concept of FIG. 27 has been implemented.

FIGS. 27 and 28 illustrate an example of using trial-and-error for acquiring the best link for client 2602. The controller knows that client 2602 is associated with AP #5 2410. The controller activates cells adjacent to AP #5 2410 one at a time in a round robin manner and waits to ascertain if client 2602 roams to a new cell, which client 2602 will ordinarily do if a new cell has a stronger RSSI. So after client 2602 associates to AP #5 2410, the controller activates one at a time in round robin fashion the following cells to give client 2602 an opportunity to roam: AP #3 2406, AP #2 2404, AP #4 2408, AP #7 2414, and AP #8 2416. Note that the controller may select any order, not just the order that was just listed. Because AP #8 2416 is closest to client 2602, client 2602 will associate with AP #8 2416 due to a stronger signal than that achieved with AP #5 2410. Therefore, as illustrated in FIG. 28, the controller leaves AP #8 2416 in an active state for client 2602. Access points AP #1 2402, AP #5 2410, and AP #6 2412 are maintained in an active state to provide a monitoring function to look for new and/or unassociated clients entering area 2400. AP #8 2416 would also monitor for new and/or unassociated clients as well. Access points AP #2 2404, AP #3 2406, AP #4 2408, and AP #7 2414 are in a power save state.

Figure 29:
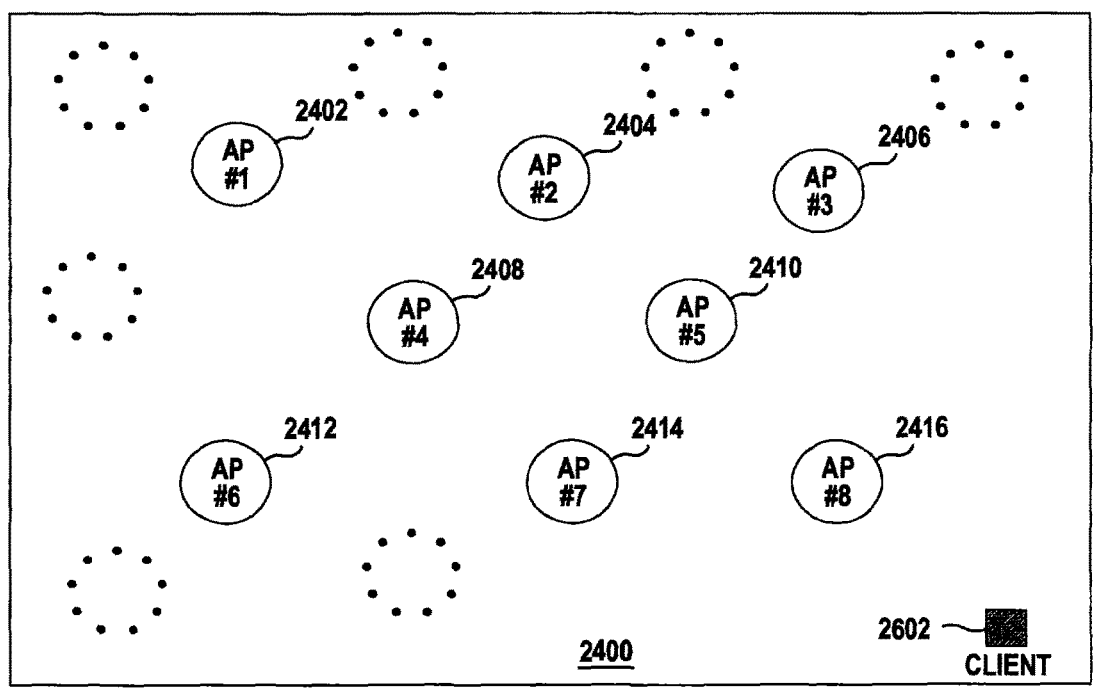
FIG. 29 illustrates an example of a controller activating neighbors of an access point of a high density network deployment, responsive to a new client associating with the access point.
Figure 30:
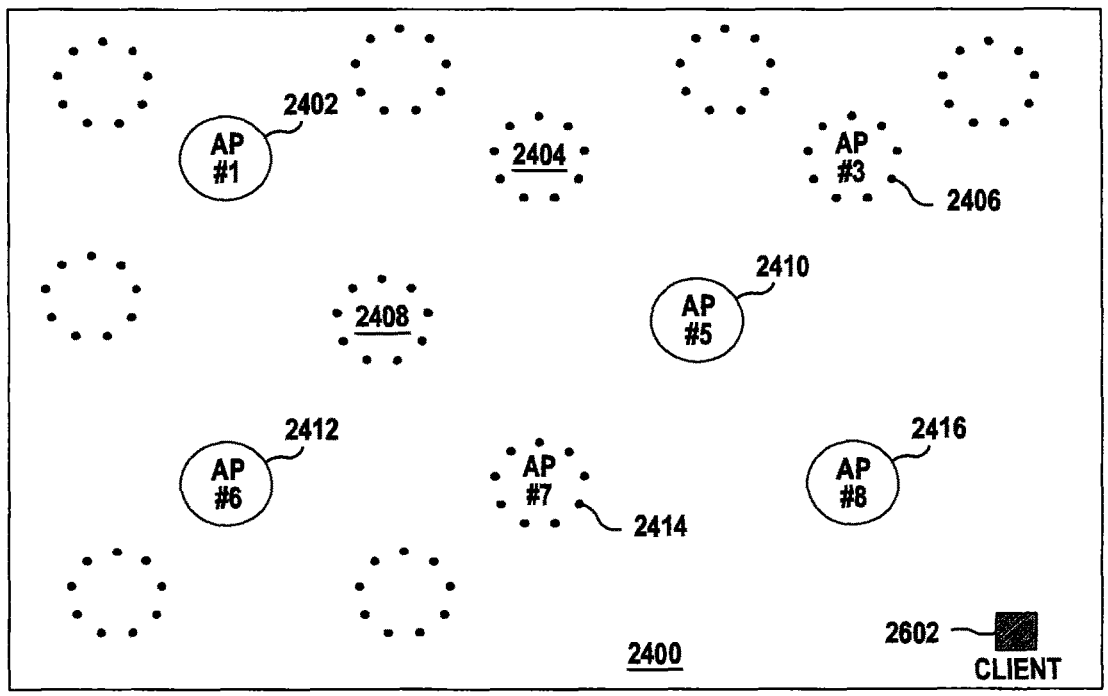
FIG. 30 illustrates the configuration of a high density network deployment after the algorithm described in FIG. 29 has been implemented.

FIGS. 29 and 30 illustrate an example of a controller activating neighbors of an access point of a high density network responsive to a new client associating with an access point. In this example, client 2602 has associated with access point AP #5 2410. In response, as illustrated in FIG. 29, the controller activates the cells adjacent to AP #5 2410, which are AP #2 2404, AP#3 2406, AP#4 2408, AP #7 2414, and AP #8 2416. This enables the client to determine if a potentially higher throughput link is available. In an example embodiment, client 2602 receives the strongest signal from AP #8 2416, which is the closest access point to client 2602. Therefore, client 2602 roams to cell #8 2416 to get the strongest signal and, thus, the highest throughput. The controller then determines that client 2602 has roamed to AP #8 2416 and, thus, switches access points AP #3 2406, AP #4 2408, and AP #7 2414 to power save mode. Access points AP #1 2402, AP #5 2410, and AP #6 2412 remain active to monitor for new and/or unassociated clients. FIG. 30 illustrates an example of the network 2400 after access points AP #3 2406, AP #4 2408, and AP #7 2414 have been switched to power save mode.

In an example embodiment, the controller may employ a load threshold-based algorithm to allow the system to dynamically accommodate more clients or more traffic by activating additional cells when appropriate. The additional cells may be cells adjacent to currently active cells, in a fixed location, or dynamically adjusted using an active grouping algorithm. The load threshold can be triggered by any of the number of clients, amount of packets, amount of bandwidth, and/or amount of retries (indicating collisions). A user interface may be provided at the controller to enable a network administrator to select thresholds. Thresholds may be selected to balance desired network performance with power savings.

In other example embodiments, APs that remain powered on can be selected based on the geographical area. For example, for an outdoor network, APs along the perimeter can remain powered on, while inner APs are powered off. Similarly, APs near doorways, hallways, etc. can remain powered on while the network is in power save mode.

Although the example embodiments illustrated in FIGS. 5-30 have been described in the context of either a low density or high density deployment, this should not be construed as limiting the examples illustrated to either a low density or high density deployment. Those skilled in the art should readily appreciate that the algorithms can be suitably adapted in order to work in either type of deployment. Moreover, many of the examples illustrated use terminology consistent with the Institute of Electrical and Electronics Engineers (IEEE) 802.11 specification. This is merely for ease of illustration, as those skilled in the art should readily appreciate that the principles described herein are suitable for almost any wireless local area network protocol.

Figure 31:
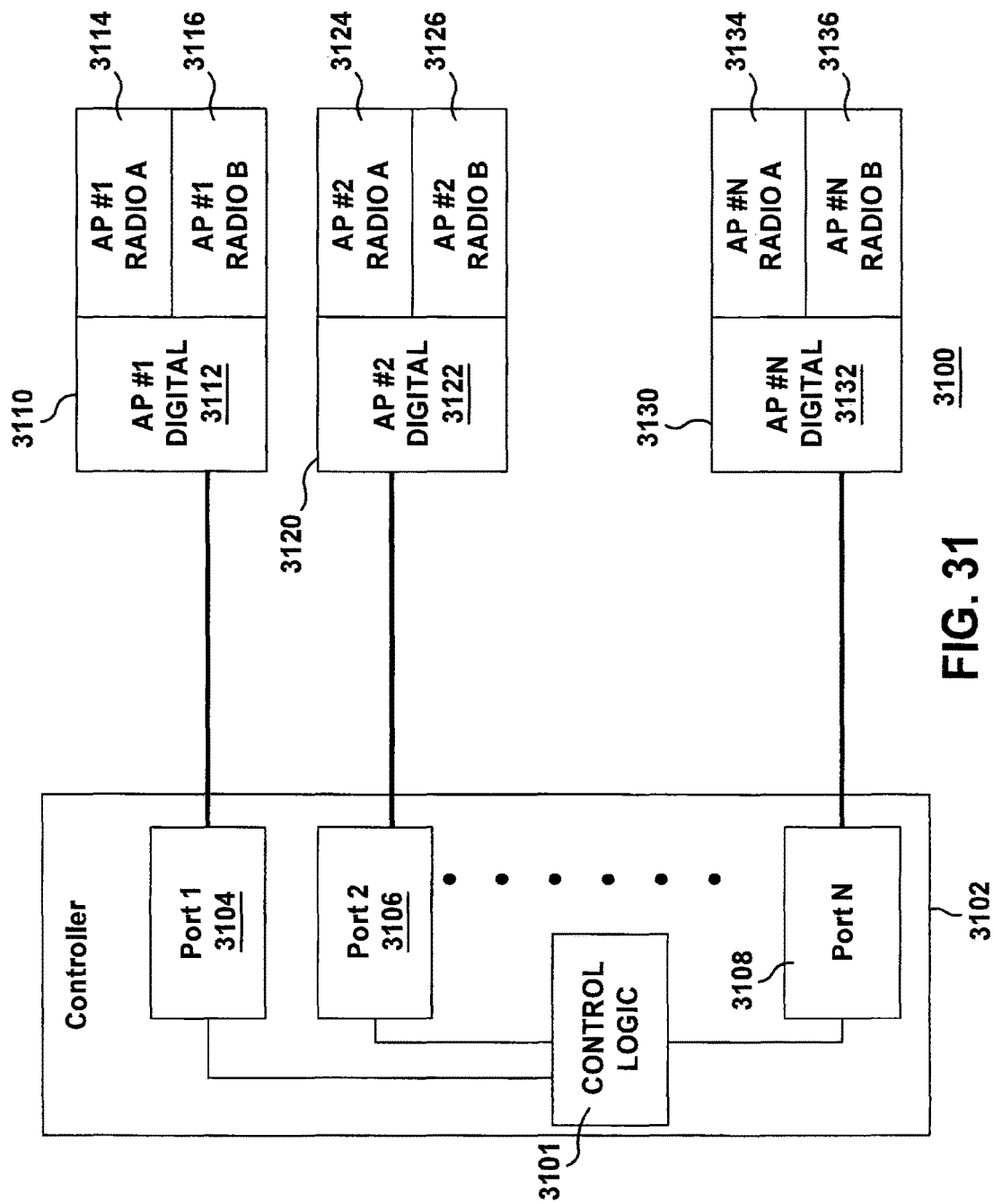
FIG. 31 illustrates an example system for illustrating various hardware power saving configurations in accordance with example embodiments.

FIG. 31 illustrates an example system 3100 for illustrating various hardware power saving configurations in accordance with example embodiments. The system comprises a controller 3102 with a plurality of communication ports for communicating with access points. Controller 3102 has N ports for communicating with up to N access points, where N is an integer greater than two and can be any physically realizable number. The first port (Port 1) 3104 communicates with access point 3110 having two radios 3114, 3116. The second port (Port 2) 3106 communicates with access point 3120 which also has two radios 3124, 3126. Communication port N (Port N) 3108 communicates with access point 3130 comprising radios 3134, 3136. In an example embodiment, control logic 3101 controls the operation of access points 3110, 3120, and 3130 and communicates with access points 3110, 3120, and 3130 via ports 3104, 3106, and 3108, respectively. In an example embodiment, control logic 3101 is always awake and activates the radio, AP digital section, and/or the controller interface (Port) to the AP when appropriate.

In an example embodiment, control logic 3101 determines which access points should be moved to a power save mode. In addition to determining which access points to switch to power save mode, control logic 3101 may also determine how the access point should implement power savings. In an example embodiment, control logic 3101 in controller 3102 signals the digital section of an access point (for example, the digital section 3112 of AP 3110) to switch to a power save mode by turning off its radio circuits 3114, 3116. In a second example embodiment, control logic 3101 signals the access point (for example, the digital section 3112 of AP 3110) to switch off its radio circuits 3114 and digital circuit 3112. In a third example embodiment, control logic 3101 signals the access point (for example, AP 3110) to power down its radios 3114, 3116 and digital section 3112, and control logic 3101 also puts the controller port (for example, port 3104 of access point 3110) in power save mode.

In still yet another example embodiment, control logic 3101 will signal the access point (for example, AP 3110) to turn off its digital section (for example digital section 3112 for AP 3110) and leave one (or both) radios on. When a radio receives an incoming signal, the radio can turn on the digital section, which would then signal the controller.

Figure 32:
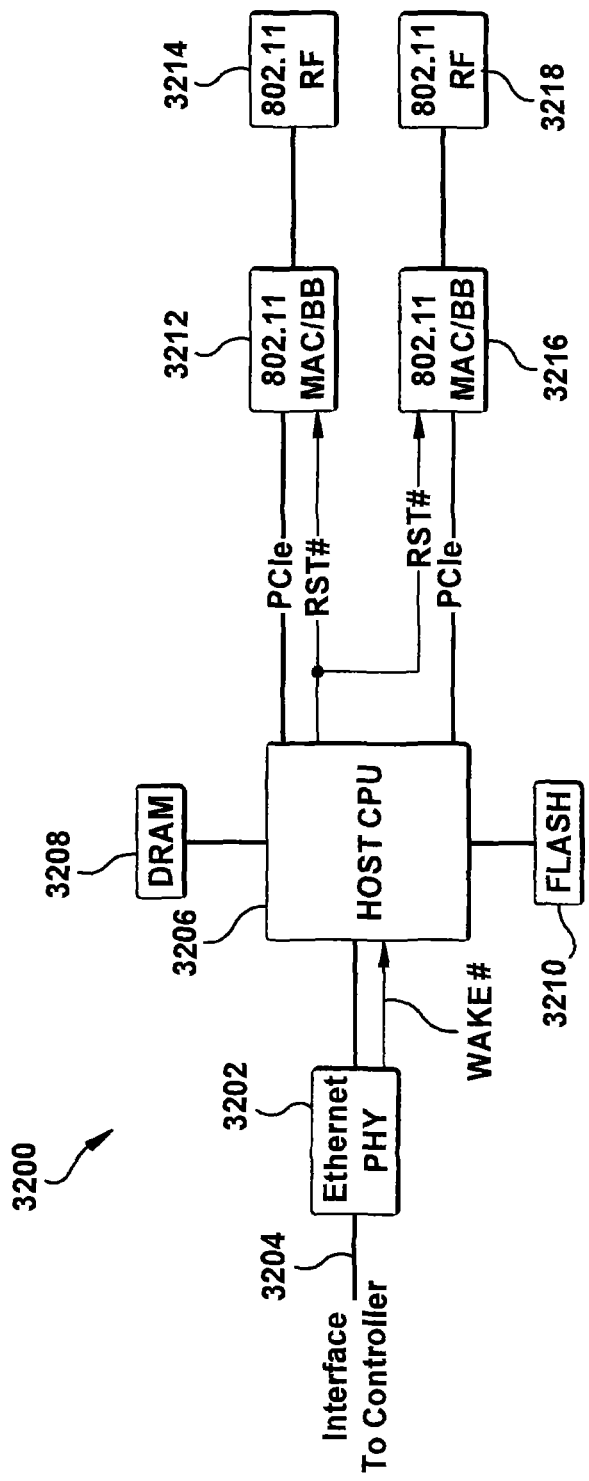
FIG. 32 illustrates an example of an access point for implementing an example embodiment.

FIG. 32 illustrates an example access point 3200, upon which an example embodiment is implemented. In the illustrated example, access point 3200 comprises two 802.11 radios; however, those skilled in the art should readily appreciate that access points with any number of radios are suitable for the examples presented herein. Moreover, any suitable wireless transceiver can be substituted for the 802.11 radios.

Access point 3200 comprises an Ethernet physical layer circuit (PHY) 3202. Ethernet PHY 3202 provides a link to the controller, as illustrated by link 3204. A host central processing unit "CPU" 3206 is coupled to Ethernet PHY 3202. Host CPU 3206 is suitably coupled to DRAM 3208 and Flash Memory 3210. A first radio is coupled to host CPU 3206. The first radio comprises an 802.11 MAC/baseband (BB) circuit 3212 and an 802.11 RF circuit 3214. A second radio comprising an 802.11 MAC/BB circuit 3216 and 802.11 RF circuit 3218 is also coupled to host CPU 3206. In an example embodiment, host CPU 3206 is coupled to MAC/BB 3212 via a first bus, e.g. a Personal Computer Interface Enhanced (PCIe) bus, and host CPU 3206 is coupled to MAC/BB 3216 via a second bus, e.g. a second PCIe bus. In an example embodiment, host CPU 3206 is configured to assert a reset (RST#) signal to MAC/BB 3212 when it desires the first radio to switch to a power save state, and host CPU 3206 is configured to assert a RST# signal to MAC/BB 3216 when it desires the second radio to switch to a power save state. Host CPU 3206 may activate either the first radio, second radio, and/or both the first and second radios by de-asserting the appropriate RST# signal. In an example embodiment, an interrupt signal (WAKE#) is included between Ethernet PHY 3202 and Host CPU 3206.

For example, in an example embodiment where the controller signals the access point to switch off one or more of its radios, the signal is received from the controller by Ethernet PHY 3202. Host CPU 3206 asserts an RST# to place one (or both) radios in a lower power state. In lower power state, the MAC/BB circuits (3212 and/or 3216) and RF circuits (3214 and/or 3218) are placed in a low power state. When the controller issues a command to exit power save mode, the command is received via Ethernet PHY 3202 and passed on to Host CPU 3206. Host CPU 3206 is responsive to receiving the command to de-assert RST#, which places the radios (MAC/BB and RF circuits) in operational mode. In an example embodiment, host CPU 3206 loads code to MAC circuits 3212 and 3216, enabling MAC processors (not shown) to boot.

In an example embodiment, instead of putting the entire radio in a power save state, which typically requires a radio MAC reboot when RST# is de-asserted, a portion of the MAC can be kept in awake mode, while the PCIe interface, internal RAM, and MAC processor can be put into power save mode such that code would not have to be reloaded and the MAC rebooted when returning to an operational state. This topology would decrease power savings but improve re-load/re-boot time when transitioning between operational (active) and power save modes.

In an example embodiment, instead of using a signal such as RST# to put the radio modules in power save mode, all power to the radios can be switched off. This would increase power savings over the previously described embodiment but has a potential cost/complexity penalty. For example, additional latency may be incurred when switching from power save to operational mode.

In yet another example embodiment, in addition to the radio modules entering a power save mode, the digital module (for example, host CPU 3206, DRAM 3208, and Ethernet PHY 3202) may also implement actions to reduce power consumption. For example, host CPU 3206 may reduce its clock rate. As another example, Ethernet PHY 3202 may renegotiate a lower power link speed with the controller. In yet another example, host CPU 3206 also may turn off external display devices such as light emitting diodes (LEDs) (not shown) that may be employed to provide status data.

In an example where the radio modules and digital sections of an access point both enter power save mode responsive to a command received from the controller to enter power save mode, Host CPU 3206 asserts RST#, which puts both radios (MAC/BB 3212, 3216 and RF 3214, 3218) in a power save state. Host CPU 3206 then places DRAM 3208 in a low power mode. Host CPU 3206 places itself in a power save mode. When the controller issues a command to exit power save mode, the command is received by Ethernet PHY 3202. Ethernet PHY 3202 then asserts a wakeup signal (WAKE#) to host CPU 3206, which switches host CPU 3206 to an operational state. Host CPU 3206 de-asserts RST#, which places both radios (MAC 3212, 3216 and RF 3214, 3218) in operational mode. Host CPU 3206 loads code to the MAC processor, and the MAC processor then boots.

In an example embodiment where the radio modules stay operational while the digital section switches to power save state, the decision as to when to switch to power save may be made by host CPU 3206 instead of control logic 3101. For example, if host CPU 3206 recognizes that no clients have been associated for a predetermined time period, host CPU 3206 may decide to switch to power save mode. Host CPU 3206 places DRAM 3208 in a power state and places itself in a low power state. The radio section (both MAC/BB 3212, 3216, and RF 3214, 3218) continue to function. If one of the radios receives a packet from a new client, the packet is processed on the appropriate MAC processor. The MAC processor signals host CPU 3206 to exit the power save state. Host CPU 3206 returns to an operational state and allows the new client to associate with the cell.

Figure 33:
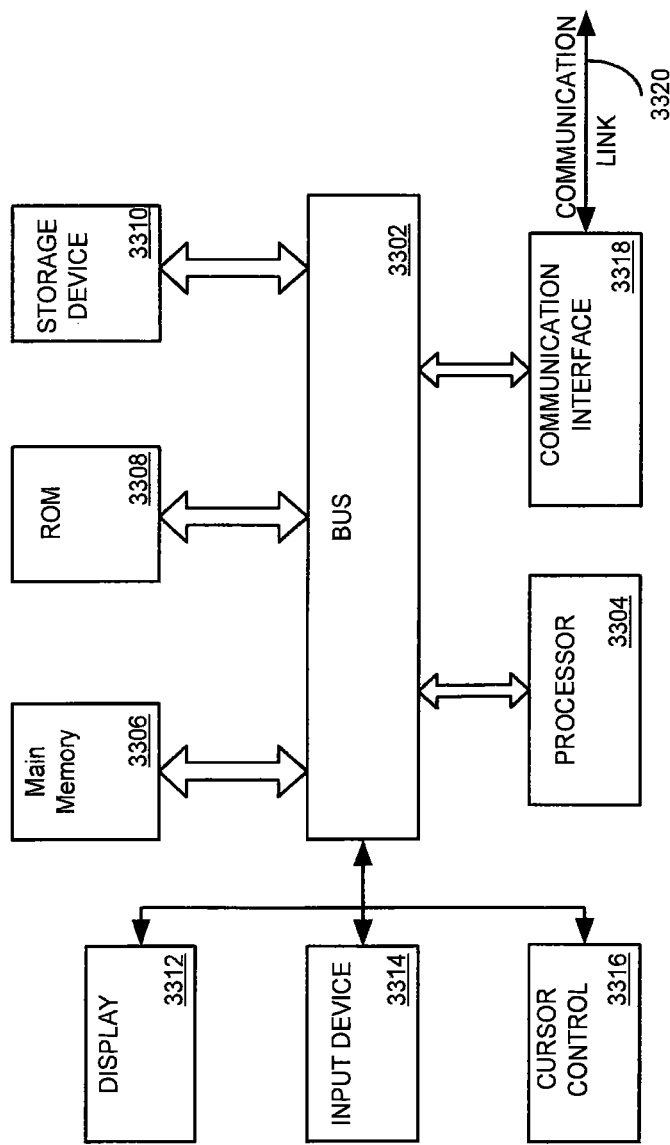
FIG. 33 illustrates an example of a computer system for implementing an example embodiment.

FIG. 33 is a block diagram that illustrates a computer system 3300 upon which an example embodiment may be implemented. Computer system 3300 is suitable for implementing the logic for the controllers described herein, as well as for the access points described herein.

Computer system 3300 includes a bus 3302 or other communication mechanism for communicating information, and a processor 3304 coupled with bus 3302 for processing information. Computer system 3300 also includes a main memory 3306, such as random access memory (RAM) or other dynamic storage device, coupled to bus 3302 for storing information and instructions to be executed by processor 3304. Main memory 3306 also may be used for storing a temporary variable or other intermediate information during execution of instructions to be executed by processor 3304. Computer system 3300 further includes a read only memory (ROM) 3308 or other static storage device coupled to bus 3302 for storing static information and instructions for processor 3304. A storage device 3310, such as a magnetic disk or optical disk, is provided and coupled to bus 3302 for storing information and instructions.

Computer system 3300 may be coupled via bus 3302 to a display 3312, such as a cathode ray tube (CRT) or liquid crystal display (LCD), for displaying information to a computer user. Display 3312 also may include status displays such as LEDs for providing operational status information. An input device 3314, such as a keyboard including alphanumeric and other keys, is coupled to bus 3302 for communicating information and command selections to processor 3304. Another type of user input device is a cursor control 3316, such as a mouse, a trackball, or cursor direction keys, for communicating direction information and command selections to processor 3304 and for controlling cursor movement on display 3312. This input device typically has two degrees of freedom in two axes: a first axis (e.g. x) and a second axis (e.g. y) that allow the device to specify positions in a plane.

An aspect of the example embodiment is related to the use of computer system 3300 for implementing power savings for wireless local area networks. According to an example embodiment, power savings for wireless local area networks is provided by computer system 3300 in response to processor 3304 executing one or more sequences of one or more instructions contained in main memory 3306. Such instructions may be read into main memory 3306 from another computer-readable medium, such as storage device 3310. Execution of the sequence of instructions contained in main memory 3306 causes processor 3304 to perform the process steps described herein. One or more processors in a multi-processing arrangement may also be employed to execute the sequences of instructions contained in main memory 3306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 3304 for execution. Such a medium may take many forms, including but not limited to non-volatile media, volatile media, and transmission media. Non-volatile media include, for example, optical or magnetic disks such as storage device 3310. Volatile media include dynamic memory such as main memory 3306. Common forms of computer-readable media include, for example, floppy disk, flexible disk, hard disk, magnetic cards, paper tape, any other physical medium with patterns of holes, RAM, PROM, EPROM, FLASHPROM, CD, DVD or any other memory chip or cartridge, or any other medium from which a computer can read.

Various forms of computer-readable media may be involved in carrying one or more sequences of one or more instructions to processor 3304 for execution. For example, the instructions may initially be borne on a magnetic disk of a remote computer. The remote computer can load the instructions into its dynamic memory and send the instructions over a telephone line using a modem. A modem local to computer system 3300 can receive the data on the telephone line and use an infrared transmitter to convert the data to an infrared signal. An infrared detector coupled to bus 3302 can receive the data carried in the infrared signal and can place the data on bus 3302. Bus 3302 carries the data to main memory 3306, from which processor 3304 retrieves and executes the instructions. The instructions received by main memory 3306 may be optionally stored on storage device 3310 either before or after execution by processor 3304.

Computer system 3300 also includes a communication interface 3318 coupled to bus 3302. Communication interface 3318 provides a two-way data communication, coupling computer system 3300 to other devices. For example, if computer system 3300 is implemented in a controller, communication interface 3318 may be used to communicate with access points over communication link 3320. In particular embodiments, several devices may be coupled via communication interface 3318, and a separate communication link 3320 may be provided to each device. As another example, computer system 3300 may be used to implement the digital section of an access point. Communication interface 3318 would be used to communicate with the controller via link 3320. In addition, an access point's wireless transceivers (not shown) may be coupled to bus 3302.

Figure 34:
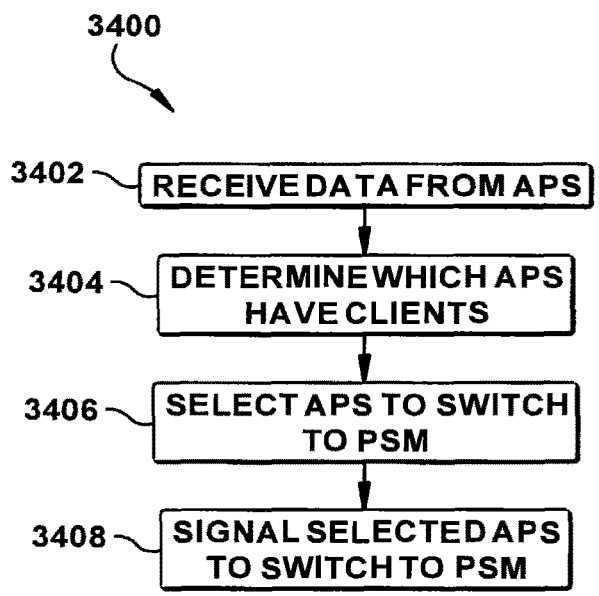
FIG. 34 illustrates an example methodology for implementing power savings in a WLAN.
Figure 35:
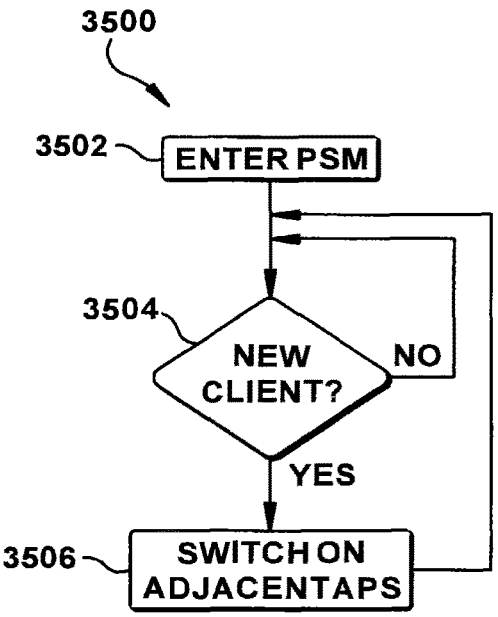
FIG. 35 illustrates an example methodology for selecting access points to switch to active mode while in power save mode.
Figure 36:
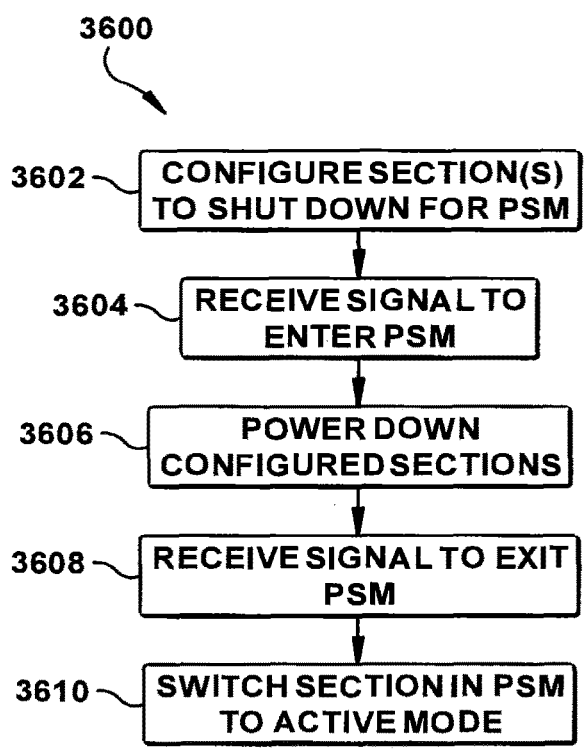
FIG. 36 illustrates an example methodology for operating at least a portion of an access point in low power mode.

In view of the foregoing structural and functional features described above, methodologies in accordance with example embodiments will be better appreciated with reference to FIGS. 34-36. While, for purposes of simplicity of explanation, the methodologies of FIGS. 34-36 are shown and described as executing serially, it is to be understood and appreciated that the example embodiments are not limited by the illustrated order, as some aspects could occur in different orders and/or concurrently with other aspects from those shown and described herein. Moreover, not all illustrated features may be required. The methodologies described herein are suitably adapted to be implemented in hardware, software, or a combination thereof.

FIG. 34 illustrates an example methodology 3400 for implementing power savings in a WLAN. In an example embodiment, methodology 3400 is implemented by a controller in communication with a plurality of access points.

At 3402, data is received from a plurality of access points about current network activity. For example, the data may include the number of associated clients, as well as throughput, data rate, signal to noise ratio (SNR), and/or Received Signal Strength Indication (RSSI) for each associated client. Based on the received data, a determination is made as to which access points (APS) currently have associated clients at 3404.

At 3406, access points are selected to be switched to power save mode (PSM) at 3408. Any suitable algorithm may be employed for selecting access points for power save mode. In an example embodiment, only access points that currently have associated clients remain active, while all other access points are switched to power save mode. In another example embodiment, in addition to access points having associated clients, access points adjacent to access points with clients remain active, while the remaining access points are switched to power save mode. Optionally, one or more access points may remain active to monitor for new clients. In still another example embodiment, clients may be grouped. For example, if a client is capable of associating with more than one access point, the client may be forced to roam to another access point with other clients, enabling the client's original access point to be switched to power save mode.

Steps 3406 and 3408 may be repeated as often as necessary. For example, if a client roams to another access point, at 3406 a new set of access points may be selected to remain active and the remaining access points may be switched to power save mode. In an example embodiment, different access points are assigned to monitor for new clients at periodic intervals. In yet another example embodiment, when a new client is associated with an access point, adjacent access points are activated to determine if the client can receive better throughput with one of the adjacent access points. The adjacent access points may be activated one at a time in a round robin fashion, or all adjacent access points may be activated concurrently.

In still another example embodiment, cell sizes may be varied. If the load on a first access point exceeds a predefined threshold, an adjacent access point may be activated. The cell may be divided between the first access point and the adjacent access point. Any suitable technique can be employed to change the cell size. For example, transmit power may be increased to increase cell size or may be decreased to decrease cell size. As another example, a clear channel threshold (CCA) may be increased to decrease cell size or may be decreased to increase cell size. Similarly, a start of packet (SOP) threshold may be increased to decrease cell size or may be decreased to increase cell size. Moreover, a combination of transmit power, CCA, and/or SOP may be varied to change cell size.

If new access points are selected to be switched to power save mode, at 3408 signals are sent to the access points selected to enter power save mode. In addition, signals may be sent to access points currently in power save mode to switch to active (operational) mode.

FIG. 35 illustrates an example methodology 3500 for selecting access points to be switched to active mode while in power save mode. At 3502, the WLAN or a portion of the WLAN enters a power save mode (PSM). At 3504, it is determined whether a new client has been detected. If a new client has been detected (YES), at 3506 adjacent access points are switched on. The adjacent access points may be switched on one at a time in a round robin fashion to ascertain whether the client will acquire a better link with an adjacent access point. In another embodiment, adjacent access points are switched on concurrently for a predetermined amount of time to ascertain whether the client will acquire a better link with an adjacent access point. In yet another alternative embodiment, data such as RSSI, TDOA, and AOA can be employed for location determination to determine whether an adjacent access point would provide a better link. If, at 3504, no new clients are detected (NO), monitoring continues.

FIG. 36 illustrates an example methodology 3600 for operating at least a portion of an access point in low power mode. Methodology 3600 can be employed to determine how an access point will save power when entering a low power state (power save mode).

At 3602, the access point is configured to determine which sections should be selected to conserve power in the lower power state and which sections should remain active. A section selected to conserve power may employ any means to save power, such as operating at lower power or turning off power. For example, an access point can be configured such that, during power save mode, the digital section (such as the host CPU, DRAM, or Flash Memory) conserves power. For example, power may be shut down to the digital section, or the host CPU may operate at a lower frequency. In an example embodiment, the Ethernet transceiver (PHY and/or MAC) connecting the host CPU to the network may operate in a lower power mode, such as by negotiating a lower speed connection with the network.

In an example embodiment, the radio section(s) of an access point may be transitioned to a low power state in power save mode. The MAC and RF sections of the transmitter may enter a lower power state, or power may be turned off to the MAC and/or RF sections. The configuration may balance between maximizing power savings (for example, by turning off power to the MAC and RF sections) and maximizing performance (for example, the MAC processor may continue operating so that it does not need to be re-booted when exiting power save mode). In addition, if the access point has more than one radio, additional options are available. For example, if the access point has two radios, then one radio may be put to sleep (low power mode) or both radios may be put to sleep.

In another example embodiment, both the digital section and radio section can be configured to enter a low power state. Power may be turned off to either section or to both sections, or either section may be configured to operate in a low power state. For example, the host CPU in the digital section may operate at a lower frequency, or the Ethernet transceiver (PHY/MAC) may renegotiate with the network to communicate with the network in a lower power state. In an example embodiment, the radio section operates in a low power state, such as by turning off power to the radio section or removing power from the RF circuit while the MAC operates in a lower power mode. In addition to the various combinations for saving power set forth above, the communications port of the associated controller also may be configured to switch off in power save mode.

At 3604, the access point receives a signal to enter power save mode. In an example embodiment, the signal is received from a controller in communication with the access point. In another example embodiment, the access point comprises logic that determines whether the access point has been dormant for a predetermined period of time; for example, if no clients have been associated with the access point for a predetermined period.

At 3606, the access point transitions the configured sections to a low power state. The access point remains in a low power state until some event occurs that would cause the access point to exit power save mode.

At 3608, the access point receives a signal to exit power save mode. The signal may be an actual command received from the associated controller. In an example embodiment, the signal is any signal received from an external device received by an operational section (or device) within the access point: for example, if the radio section is operational, a signal from a mobile device (client); if the digital section is in low power mode, a signal from the controller; or a data packet forwarded by the controller that is received by the Ethernet transceiver.

At 3610, the section of the access point in power save mode is transitioned to an active (operational) mode. For example, if a signal (or packet) is received by the Ethernet PHY, then the Ethernet PHY can signal the host CPU and the host CPU can signal the radio section. As another example, if the radio section receives a packet, the a signal (such as an interrupt) can be generated to signal the digital section to exit power save mode. If the communication port of the associated controller is in power save mode, then a signal may be sent from the Ethernet PHY to the controller port to exit power save mode.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications, and variations that fall within the spirit and scope of the appended claims, interpreted in accordance with the breadth to which they are fairly, legally, and equitably entitled.

The invention claimed is:

1. A system, comprising:
a controller; and
a first access point, the first access point comprising:
processing logic; and
at least one wireless transceiver in communication with the processing logic, wherein the wireless transceiver is configured to send data to, and receive data from, client devices;
wherein the processing logic is configured to:
determine a number of the client devices associated to the first access point, and
transmit the number to the controller; and
wherein the controller is configured to:
determine that at least one client device is associated with the first access point;
determine that the at least one client device is capable of associating with a second access point;
force the at least one client device to roam to the second access point; and
transmit a signal to the first access point to switch to a power save mode,
wherein at least one of the processing logic and the at least one wireless transceiver is configured to switch to the power save mode responsive to receiving the signal from the controller, wherein the signal represents a determination that no client device is associated with the first access point.

2. The system of claim 1, wherein the processing logic switches to the power save mode responsive to the signal.

3. The system of claim 2, wherein in response to receiving a wireless signal, the at least one wireless transceiver sends a wakeup signal to the processing logic; and
wherein the processing logic is responsive to the wakeup signal to leave the power save mode.

4. The system of claim 1, wherein the at least one wireless transceiver switches to the power save mode responsive to the signal.

5. The system of claim 4, wherein the processing logic is responsive to receiving a different signal from the controller to send a wakeup signal to the at least one wireless transceiver; and
wherein the at least one wireless transceiver is responsive to the wakeup signal to leave the power save mode.

6. The system of claim 1, wherein the at least one wireless transceiver comprises at least two wireless transceivers; and
wherein in response to receiving the signal from the controller one of the two wireless transceivers enters the power save mode while the other of the two wireless transceivers remains operational.

7. The system of claim 1, wherein the controller is external to the first access point and is configured to determine that no client device is associated with the first access point.

8. The system of claim 1,
wherein the processing logic is configured to determine that no client device is associated with the first access point.

9. A method of operation for an access point, comprising:
receiving, from a first access point metadata indicating a number of client devices associated with the first access point;
determining that at least one client device is associated with the first access point;
determining that the at least one client device is capable of associating with a second access point;
forcing the at least one client device to roam to the second access point; and
transmitting a signal to the first access point to switch to a power save mode, wherein the signal represents a determination that no client device is associated with the first access point.

10. The method of claim 9, wherein processing logic in the first access point is selected to switch to the power save mode and the processing logic is switched to the power save mode responsive to the signal.

11. The method of claim 10, further comprising, in response to receiving a wireless signal, sending, from at least one wireless transceiver in the first access point, a wakeup signal to the processing logic, and
in response to the wakeup signal, switching the processing logic out of the power save mode.

12. The method of claim 9, wherein at least one wireless transceiver in the first access point is selected to switch to the power save mode and the at least one wireless transceiver is switched to the power save mode responsive to the signal.

13. The method of claim 12, further comprising receiving, at processing logic in the first access point a different signal from a controller to send a wakeup signal to the at least one wireless transceiver;
sending, from the processing logic, the wakeup signal to the at least one wireless transceiver, and
in response to the wakeup signal, switching the at least one wireless transceiver out of the power save mode.

14. The method of claim 9, wherein the first access point comprises at least two wireless transceivers, the method further comprising switching one of the two wireless transceivers into the power save mode and maintaining the other of the two wireless transceivers as operational in response to receiving the signal from a controller.

15. The method of claim 9, further comprising determining, by processing logic in the first access point, that no client device is communicating with at least one wireless transceiver in the first access point.

16. A non-transitory computer readable medium comprising computer code that when executed by a processor is operable to:
receive, from a first access point, metadata indicating a number of client devices associated with the first access point;
determining that at least one client device is associated with the first access point;
determining that the at least one client device is capable of associating with a second access point;
forcing the at least one client device to roam to the second access point; and
transmitting a signal to the first access point to switch to a power save mode, wherein the signal represents a determination that no client device is associated with the first access point.

17. The non-transitory computer readable medium of claim 16, further operable to select processing logic in the first access point to switch to the power save mode and to switch the processing logic to the power save mode responsive to the signal.

18. The non-transitory computer readable medium of claim 17, further operable to, in response to receiving a different wireless signal, send, from at least one wireless transceiver in the first access point, a wakeup signal to the processing logic, and
in response to the wakeup signal, operable to switch the processing logic out of the power save mode.

19. The non-transitory computer readable medium of claim 16, further operable to:
select wherein at least one wireless transceiver in the first access point to switch to the power save mode, and
switch the at least one wireless transceiver to the power save mode responsive to the signal.

20. The non-transitory computer readable medium of claim 19, further operable to receive, at processing logic in the first access point, a different signal from a controller to send a wakeup signal to the at least one wireless transceiver;
send, from the processing logic, the wakeup signal to the at least one wireless transceiver, and
in response to the wakeup signal, switching the at least one wireless transceiver out of the power save mode.

* * * * *